United States Patent
Lee et al.

(10) Patent No.: US 9,979,048 B2
(45) Date of Patent: May 22, 2018

(54) POLYMER ELECTROLYTE FOR LITHIUM BATTERY AND LITHIUM BATTERY EMPLOYING THE POLYMER ELECTROLYTE

(71) Applicant: Samsung Electronics Co., Ltd., Suwon-si, Gyeonggi-do (KR)

(72) Inventors: Myungjin Lee, Seoul (KR); Jehwon Choi, Suwon-si (KR); Soyeon Kim, Suwon-si (KR); Dahye Park, Hwaseong-si (KR); Joungwon Park, Yongin-si (KR); Yonggun Lee, Incheon (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 615 days.

(21) Appl. No.: 14/550,642

(22) Filed: Nov. 21, 2014

(65) Prior Publication Data

US 2015/0155594 A1 Jun. 4, 2015

(30) Foreign Application Priority Data

Nov. 29, 2013 (KR) ........................ 10-2013-0147989

(51) Int. Cl.
| | |
|---|---|
| *H01M 10/056* | (2010.01) |
| *H01M 10/0565* | (2010.01) |
| *H01M 10/052* | (2010.01) |
| *C08F 30/02* | (2006.01) |
| *H01M 4/62* | (2006.01) |
| *H01M 4/02* | (2006.01) |

(52) U.S. Cl.
CPC ........ *H01M 10/0565* (2013.01); *C08F 30/02* (2013.01); *H01M 4/62* (2013.01); *H01M 10/052* (2013.01); *H01M 2004/027* (2013.01); *H01M 2300/0022* (2013.01); *H01M 2300/0082* (2013.01); *Y02T 10/7011* (2013.01)

(58) Field of Classification Search
CPC .................................................. H01M 10/0565
USPC ......................................................... 429/310
See application file for complete search history.

(56) References Cited

U.S. PATENT DOCUMENTS

| | | | |
|---|---|---|---|
| 4,357,215 A | 11/1982 | Goodenough et al. | |
| 6,727,023 B2 | 4/2004 | Ono | |

(Continued)

FOREIGN PATENT DOCUMENTS

| | | |
|---|---|---|
| DE | 102006054951 A1 | 5/2008 |
| DE | 102011102438 A1 | 11/2012 |

(Continued)

OTHER PUBLICATIONS

European Search Report dated May 4, 2015 with English Translation.

Feng et al., "Single lithium-ion conducting polymer electrolytes based on poly[(4-styrenesulfonyl)(trifuluoromethanesulfonyl)imide] anions", Electrochimica Acta, 93, 2013, pp. 254-263.

(Continued)

*Primary Examiner* — Basia Ridley
*Assistant Examiner* — James Erwin
(74) *Attorney, Agent, or Firm* — Cantor Colburn LLP

(57) ABSTRACT

A polymer electrolyte for a lithium battery, wherein the polymer electrolyte includes a polymerization product of a lithium ion conductive compound including an ethylenically unsaturated bond, a lithium ion conductive unit, and an ion-exchangeable functional group; and a heteroatom-containing ionic liquid polymerizable with the lithium ion conductive compound.

21 Claims, 6 Drawing Sheets

(56) References Cited

U.S. PATENT DOCUMENTS

| | | |
|---|---|---|
| 7,347,954 B2 | 3/2008 | Banno et al. |
| 7,513,136 B2 | 4/2009 | Laliberte et al. |
| 7,531,012 B2 | 5/2009 | Sudan et al. |
| 7,547,492 B2 | 6/2009 | Awano et al. |
| 7,700,241 B2 | 4/2010 | Best et al. |
| 7,955,738 B2 | 6/2011 | Singh et al. |
| 7,968,224 B2 | 6/2011 | Sudan et al. |
| 2002/0055045 A1* | 5/2002 | Michot .................. C07C 45/46 429/307 |
| 2004/0013944 A1* | 1/2004 | Lee ....................... H01M 6/168 429/317 |
| 2006/0120021 A1 | 6/2006 | Banno et al. |
| 2009/0263725 A1 | 10/2009 | Balsara et al. |
| 2009/0292105 A1* | 11/2009 | Michot ................ C07D 249/12 528/391 |
| 2011/0206994 A1 | 8/2011 | Balsara et al. |
| 2011/0281173 A1 | 11/2011 | Singh et al. |

FOREIGN PATENT DOCUMENTS

| | | |
|---|---|---|
| JP | 2009-203455 A | 9/2009 |
| JP | 2010-285508 A | 12/2010 |
| KR | 1020050057462 A | 6/2005 |
| KR | 1020100106985 A | 10/2010 |

OTHER PUBLICATIONS

Guo et al., "Synthesis and characterization of novel anion exchange membranes based on imidazolium-type ionic liquid for alkaline fuel cells", Journal of Membrane Science, 362, 2010. pp. 97-104.

Karo et al., "A Molecular Dynamics study of the influence of side-chain length and spacing on lithium mobility in non-crystalline $LiPF_6.PEO_x; x=10$ and 30", Solid State Ionics, 180, 2009, pp. 1272-1284.

* cited by examiner

POLYMER ELECTROLYTE FOR LITHIUM BATTERY AND LITHIUM BATTERY EMPLOYING THE POLYMER ELECTROLYTE

CROSS REFERENCE TO RELATED APPLICATIONS

This application claims priority to Korean Patent Application No. 10-2013-0147989, filed on Nov. 29, 2013, and all the benefits accruing therefrom under 35 U.S.C. § 119, the content of which is incorporated herein in its entirety by reference.

BACKGROUND

1. Field

The present disclosure relates to a polymer electrolyte for a lithium battery and a lithium battery including the polymer electrolyte.

2. Description of the Related Art

An electrolyte of a lithium battery is a liquid electrolyte, in which a solid electrolyte salt is dissolved in a non-aqueous solvent, or a solid electrolyte, which is a polymer prepared by solidifying the liquid electrolyte.

A liquid electrolyte includes a volatile and inflammable non-aqueous electrolyte solution, which may leak if the battery becomes old or damaged. Thus, the liquid electrolyte is not reliable for a long-term use.

In contrast, a solid electrolyte resolves the problems of a liquid electrolyte. Particularly, a manufacturing process of the solid electrolyte may be simplified, as a result of which the solid electrolyte may become thinned, miniaturized, and light-weighted. However, a solubility of the electrolyte salt with respect to the non-aqueous solvent used together with the solid electrolyte is not sufficient. As a consequence, an amount of the added electrolyte salt is limited, and thus an ion conductivity of the electrolyte and a capacity of a battery may be reduced. A method of using an ionic liquid as an electrolyte salt is being suggested to resolve the problem.

However, since an ionic liquid is a liquid, a leakage problem of the liquid electrolyte may still persist. Therefore, there remains a need in a solid electrolyte prepared by solidifying an ionic liquid which would eliminate the leakage problem and thus provide high safety.

SUMMARY

Provided are a novel polymer, a polymer electrolyte for a lithium battery using the novel polymer, a negative electrode protection layer for a lithium battery including the novel polymer, and a lithium battery with improved electrochemical stability including at least one selected from the polymer electrolyte and the negative electrode protection layer.

Additional aspects will be set forth in part in the description which follows and, in part, will be apparent from the description, or may be learned by practice of the presented embodiments.

According to an aspect, a polymer electrolyte for a lithium battery includes a polymerization product of a lithium ion conductive compound including an ethylenically unsaturated bond, a lithium ion conductive unit, and an ion-exchangeable functional group; and a heteroatom-containing ionic liquid polymerizable with the lithium ion conductive compound.

According to another aspect, a lithium battery includes the polymer electrolyte.

According to another aspect, a polymer includes a polymerization product of a lithium ion conductive compound including an ethylenically unsaturated bond, a lithium ion conductive unit, and an ion-exchangeable functional group; and a heteroatom-containing ionic liquid that is polymerizable with the lithium ion conductive compound.

According to another aspect, a negative electrode protection layer for a lithium battery includes the polymer.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
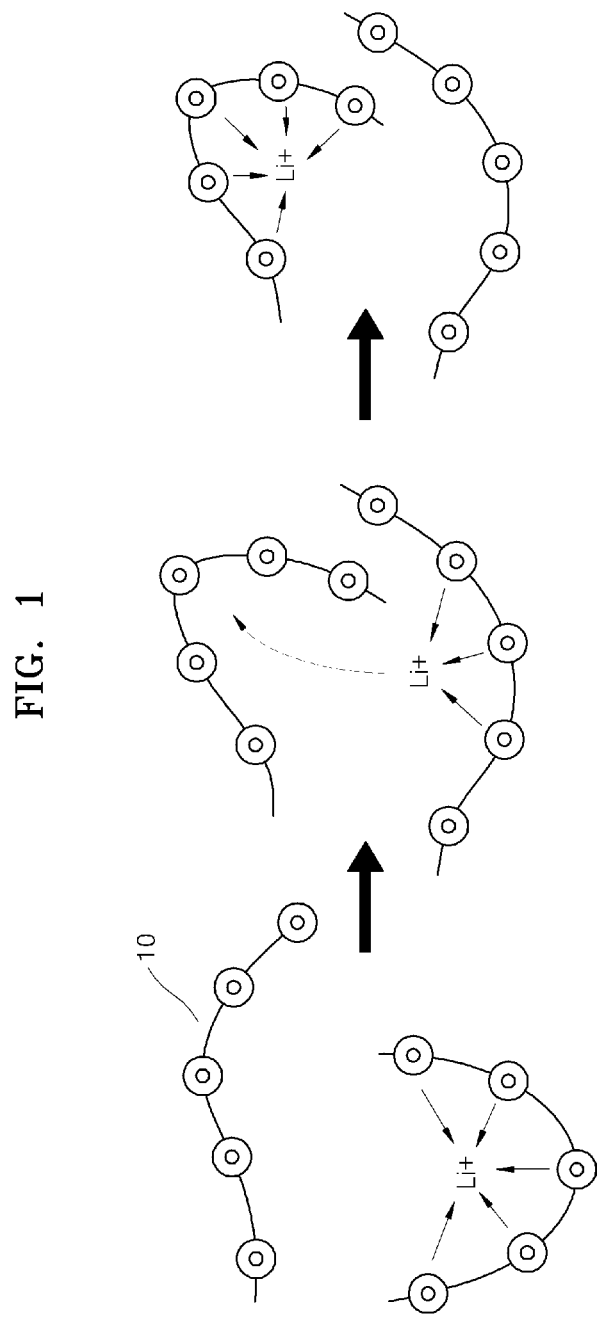
FIG. 1 illustrates a process of an ethylene oxide unit contributing lithium conduction.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list.

It will be understood that when an element is referred to as being "on" another element, it can be directly in contact with the other element or intervening elements may be present therebetween. In contrast, when an element is referred to as being "directly on" another element, there are no intervening elements present.

It will be understood that, although the terms first, second, third, etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an," and "the" are intended to include the plural forms as well, unless the context clearly indicates otherwise.

The term "or" means "and/or." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a polymer electrolyte for a lithium battery and a lithium battery using the electrolyte according to an embodiment will be described in detail.

Provided is a polymer electrolyte for a lithium battery including a polymerization product of a lithium ion conductive compound including an ethylenically unsaturated bond, a lithium ion conductive unit, and an ion-exchangeable functional group; and a heteroatom-containing ionic liquid that is polymerizable with the lithium ion conductive compound.

In the polymerization product, the term "polymerization" used herein refers to all possible reactions between the lithium ion conductive compound and a heteroatom-containing ionic liquid such as a cross-linking reaction or a graft reaction, as well as a general copolymerization reaction (e.g., a copolymerization reaction, a cross-linking reaction, and a graft reaction between an ethylenically unsaturated bond of an ionic conductive compound and a polymerizable functional group of a heteroatom-containing ionic liquid).

The lithium ion conductive compound is a compound having a backbone of ethylenically unsaturated double bonds, and thus the compound may have a structure of a lithium ion conductive unit and a lithium ion conductive functional group, such as an ion-exchange functional group located at a side chain of the compound. In this regard, when the unit and the functional group are located at the side chain of the compound, mobility of lithium ions may be facilitated, and thus excellent durability of the compound with respect to an organic solvent may be achieved.

When a polymerization reaction is performed to obtain a polymerization product of the lithium ion conductive compound and the heteroatom-containing ionic liquid as described above, a cross-linkable compound may be further included. Therefore, according to another aspect, a polymer electrolyte may include a polymerization product of a lithium ion conductive compound including an ethylenically unsaturated bond, a lithium ion conductive unit, and an ion-exchangeable functional group;

a heteroatom-containing ionic liquid; and a cross-linkable compound.

In the polymerization product that constitutes the polymer electrolyte, a main chain of the lithium ion conductive compound forms a hydrophobic main chain and a lithium ion conductive unit forms a hydrophilic side chain. Also, the polymerization product has an interpenetration polymer network (IPN) structure. Thus, the polymer electrolyte with an excellent chemical resistance at a high temperature according to an embodiment may be obtained by performing a polymerization of the lithium ion conductive compound and the heteroatom-containing ionic liquid. The polymer electrolyte thus obtained may have improved ion conductivity and mechanical properties at the same time and reduced solubility in an organic solvent, and thus a stability of the polymer electrolyte may be significantly improved.

The lithium ion conductive unit may be, for example, an alkylene oxide unit. As used herein, the term "alkylene oxide unit" refers to a lithium ion conductive unit including an alkylene oxide fragment —O—C($R^{101}$)($R^{102}$)C($R^{103}$)($R^{104}$)—, —O—C($R^{101}$)($R^{102}$)—, and —O—C($R^{101}$)($R^{102}$)C($R^{103}$)($R^{10}$)C($R^{105}$)($R^{106}$)—, wherein $R^{101}$, $R^{102}$, $R^{103}$, $R^{104}$, $R^{105}$, and $R^{106}$ are each independently a hydrogen atom or an unsubstituted or substituted C1-C30 alkyl group, for example, a hydrogen atom or a C1-C4 alkyl group.

FIG. 1 illustrates a process of an ethylene oxide unit contributing lithium conduction when an ethylene oxide unit 10 is used as the alkylene oxide unit.

Referring to FIG. 1, as oxygen of the ethylene oxide unit 10 forms a coordinate bond with lithium, diffusion of lithium ions may be facilitated, and thus lithium ion conductivity may improve.

The ion-exchangeable functional group of the lithium ion conductive compound may be an acid functional group providing protons for ion conduction in the presence of a solvent, such as water. For example, the acid functional group may be at least one selected from a hydroxyl group, a phosphoric acid group (—OP(=O)(=OH)$_2$), a sulfonic acid group (—SO$_3$H), and a carboxylic acid group (—COOH). The heteroatom-containing ionic liquid may be an ionic liquid represented by Formula 1 or Formula 1a.

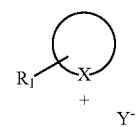

Formula 1

In Formula 1,

denotes an unsubstituted or substituted 3 to 31 membered ring including 2 to 30 carbon atoms and at least one heteroatom selected from nitrogen, oxygen, phosphorus, and sulfur;

X is —N(R$_2$)(R$_3$), —N(R$_2$), —P(R$_2$), or —P(R$_2$)(R$_3$);

R$_2$ and R$_3$ are each independently a hydrogen atom, an unsubstituted or substituted C1-C30 alkyl group, an unsubstituted or substituted C1-C30 alkoxy group, an unsubstituted or substituted C6-C30 aryl group, an unsubstituted or substituted C6-C30 aryloxy group, an unsubstituted or substituted C3-C30 heteroaryl group, an unsubstituted or substituted C3-C30 heteroaryloxy group, an unsubstituted or substituted C4-C30 cycloalkyl group, or an unsubstituted or substituted C3-C30 heterocycloalkyl group;

R$_1$ is a polymerizable substituent group; and

Y$^-$ is an anion.

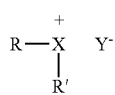

Formula 1a

In Formula 1a,

X and Y$^-$ are as defined in Formula 1; at least one of R and R' comprises a polymerizable substituent or an organic group including a polymerizable substituent, wherein the organic group is selected from an unsubstituted or substituted C1-C30 alkyl group, an unsubstituted or substituted C2-C30 alkenyl group, an unsubstituted or substituted C2-C30 alkynyl group, an unsubstituted or substituted C1-C30 alkoxy group, an unsubstituted or substituted C6-C30 aryl group, an unsubstituted or substituted C6-C30 aryloxy group, an unsubstituted or substituted C3-C30 heteroaryl group, an unsubstituted or substituted C3-C30 heteroaryloxy group, an unsubstituted or substituted C4-C30 cycloalkyl group, or an unsubstituted or substituted C3-C30 heterocycloalkyl group; and the unselected rest of R and R' is an unsubstituted or substituted C1-C30 alkyl group, an unsubstituted or substituted C2-C30 alkenyl group, an unsubstituted or substituted C2-C30 alkynyl group, an unsubstituted or substituted C1-C30 alkoxy group, an unsubstituted or substituted C6-C30 aryl group, an unsubstituted or substituted C6-C30 aryloxy group, an unsubstituted or substituted C3-C30 heteroaryl group, an unsubstituted or substituted C3-C30 heteroaryloxy group, an unsubstituted or substituted C4-C30 cycloalkyl group, or an unsubstituted or substituted C3-C30 heterocycloalkyl group.

In Formula 1a, the polymerizable substituent has a reactive unsaturated bond. For example, the polymerizable substituent is a vinyl group or an allyl group.

The organic group having the polymerizable substituent is a hydrocarbyl group which has a reactive unsaturated bond.

In Formula 1,

is an unsubstituted or substituted C2-C30 heterocyclic ring or an unsubstituted or substituted C3-C30 heteroaryl ring, and when X is linked to a double bond, X is —N(R$_2$) or —P(R$_2$).

The substituted 3 to 31 membered ring described above may be substituted with a halogen atom, a C1-C20 alkyl group (e.g., CF$_3$, CHF$_2$, CH$_2$F, or CCl$_3$) substituted with a halogen atom, a C1-C20 alkoxy group, a C2-C20 alkoxyalkyl group, a hydroxyl group, a nitro group, a cyano group, an amino group, an amidino group, a hydrazine group, a hydrazone group, a carboxylic acid group or a salt thereof, a sulfonyl group, a sulfamoyl group, a sulfonic acid group or a salt thereof, a phosphoric acid group or a salt thereof, a C1-C20 alkyl group, a C2-C20 alkenyl group, a C2-C20 alkynyl group, a C1-C20 heteroalkyl group, a C6-C20 aryl group, a C7-C20 arylalkyl group, a C6-C20 heteroaryl group, a C7-C20 heteroarylalkyl group, a C6-C20 heteroaryloxy group, a C7-C20 heteroaryloxyalkyl group, or a C7-C20 heteroarylalkyl group.

R$_1$ is a polymerizable substituent having a reactive unsaturated bond, for example, a vinyl group or an allyl group.

In Formula 1,

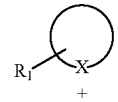

is a cation represented by Formula 2.

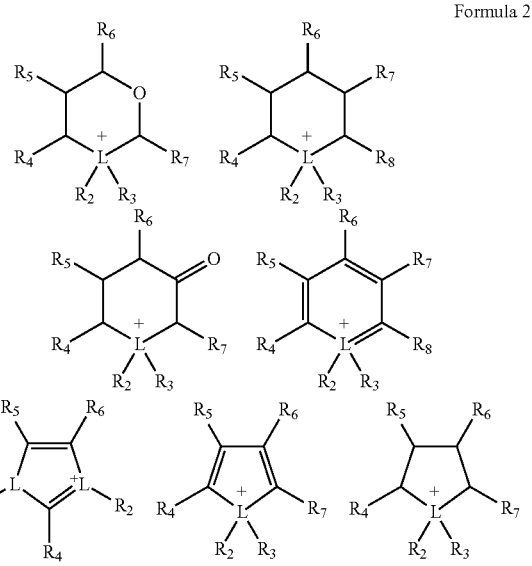

Formula 2 wherein in Formula 2,

L is N or P;

at least one of R$_2$ to R$_8$ is a C2-C10 alkenyl group; and the unselected rest of $R_2$ to $R_8$ are each independently a hydrogen atom, an unsubstituted or substituted C1-C30 alkyl group, an unsubstituted or substituted C2-C30 alkenyl group, an unsubstituted or substituted C2-C30 alkynyl group, an unsubstituted or substituted C1-C30 alkoxy group, an unsubstituted or substituted C6-C30 aryl group, an unsubstituted or substituted C6-C30 aryloxy group, an unsubstituted or substituted C3-C30 heteroaryl group, an unsubstituted or substituted C3-C30 heteroaryloxy group, an unsubstituted or substituted C4-C30 cycloalkyl group, or an unsubstituted or substituted C3-C30 heterocycloalkyl group.

According to an embodiment,

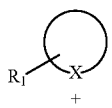

may be a cation represented by Formula 2a.

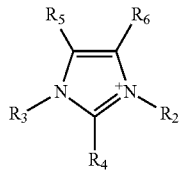

Formula 2a

In Formula 2a,
at least one of $R_2$ to $R_6$ is a C2-C10 alkenyl group; and
the unselected rest of $R_2$ to $R_6$ are each independently a hydrogen atom, an unsubstituted or substituted C1-C30 alkyl group, an unsubstituted or substituted C2-C30 alkenyl group, an unsubstituted or substituted C2-C30 alkynyl group, an unsubstituted or substituted C1-C30 alkoxy group, an unsubstituted or substituted C6-C30 aryl group, an unsubstituted or substituted C6-C30 aryloxy group, an unsubstituted or substituted C3-C30 heteroaryl group, an unsubstituted or substituted C3-C30 heteroaryloxy group, an unsubstituted or substituted C4-C30 cycloalkyl group, or an unsubstituted or substituted C3-C30 heterocycloalkyl group.

The alkenyl group is, for example, an allyl group.
$R_4$ to $R_8$ are each a hydrogen atom,
one of $R_2$ and $R_3$ is a C1-C10 alkyl group or a C2-C10 alkenyl group, and
the other one of $R_2$ and $R_3$ is a C2-C20 alkenyl group.

In Formula 1, $Y^-$ is at least one anion selected from $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $Cl^-$, $Br^-$, $I^-$, $CF_3SO_3^-$, $(C_2F_5SO_2)_2N^-$, $(C_2F_5SO_2)(CF_3SO_2)N^-$, and $(CF_3SO_2)_2N^-$, for example, at least one anion selected from $BF_4^-$, $Cl^-$, $Br^-$, $I^-$, $PF_6^-$, $ClO_4^-$, $CF_3SO_3^-$, $(CF_3SO_2)_2N^-$, $CF_3CO_2^-$, and $(C_2F_5SO_2)_2N^-$.

An ionic liquid according to an embodiment is a compound represented by Formula 3.

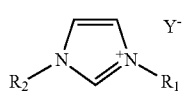

Formula 3

In Formula 3,
$R_1$ is a methyl group, a butyl group, or an allyl group,
$R_2$ is a vinyl group or an allyl group, and $Y^-$ is at least one selected from $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $Cl^-$, $Br^-$, $I^-$, $CF_3SO_3^-$, $(C_2F_5SO_2)_2N^-$, $(C_2F_5SO_2)(CF_3SO_2)N^-$, and $(CF_3SO_2)_2N^-$.

$Y^-$ is, for example, at least one selected from $BF_4^-$, $Cl^-$, $Br^-$, $I^-$, $PF_6^-$, $ClO_4^-$, $CF_3SO_3^-$, $(CF_3SO_2)_2N^-$, $CF_3CO_2^-$, and $(C_2F_5SO_2)_2N^-$.

The lithium ion conductive compound according to an embodiment contains an alkylene oxide unit located at the side chain. The alkylene oxide unit is, for example, an ethylene oxide unit. When the alkylene oxide unit is located at the side chain, not the main chain, ion conductivity may be facilitated. For example, a polymerization product of the lithium ion conductive compound and the heteroatom-containing ionic liquid may be Compound A shown in Reaction Scheme 1.

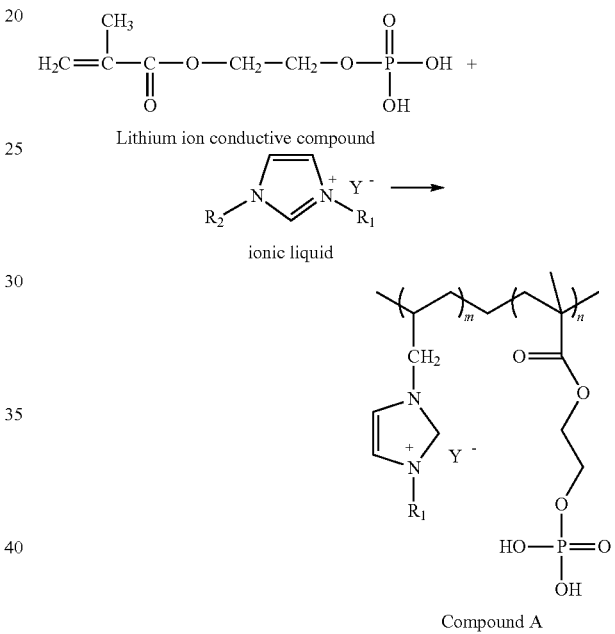

In Reaction Scheme 1, $Y^-$ is $BF_4^-$ or $TFSI^-$, $R_1$ is methyl, butyl or allyl, and $R_2$ is allyl. In Reaction Scheme 1, Compound A contains an ethylene oxide unit at the side chain, and thus oxygen of the ethylene oxide unit forms a coordinate bond with lithium. Therefore, as diffusion of lithium is facilitated, a lithium ion conductivity may be significantly improved.

The ionic liquid may be, for example, 1-allyl-3-methylimidazolium bis(trifluoromethylsulfonyl)imide represented by Formula 3a or 1-allyl-3-butylimidazolium bis(trifluoromethylsulfonyl)imide represented by Formula 3b.

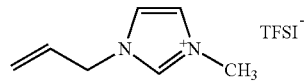

Formula 3a

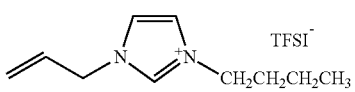

Formula 3b

The ionic liquid represented by Formula 1a may be a compound represented by Formula 1b or Formula 1c.

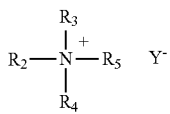

Formula 1b

In Formula 1b, $R_2$ to $R_5$ are each independently a hydrogen atom, an unsubstituted or substituted C1-C30 alkyl group, an unsubstituted or substituted C1-C30 alkoxy group, an unsubstituted or substituted C6-C30 aryl group, an unsubstituted or substituted C6-C30 aryloxy group, an unsubstituted or substituted C3-C30 heteroaryl group, an unsubstituted or substituted C3-C30 heteroaryloxy group, an unsubstituted or substituted C4-C30 cycloalkyl group, or an unsubstituted or substituted C3-C30 heterocycloalkyl group, provided that at least one of $R_2$ to $R_5$ is a C2-C10 alkenyl group, and $Y^-$ is an anion.

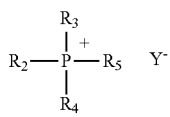

Formula 1c

In Formula 1c, descriptions of $R_2$ to $R_5$ and $Y^-$ are as defined in Formula 2b.

The alkenyl group is, for example, an allyl group.

The lithium ion conductive compound is a compound represented by Formula 4 or its polymer thereof.

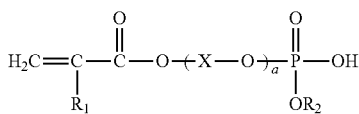

Formula 4

In Formula 4,

X is an unsubstituted or substituted C1-C20 alkylene group, a is an integer of 1 to 10, $R_1$ is a hydrogen atom or a C1-C20 alkyl group, $R_2$ is one selected from a hydrogen atom, an unsubstituted or substituted C1-C20 alkyl group, an unsubstituted or substituted C1-C20 hydroxyalkyl group, and an unsubstituted or substituted C1-C20 hydroxyalkylamino group.

The lithium ion conductive compound is, for example, a compound represented by Formula 5 or a compound represented by Formula 6.

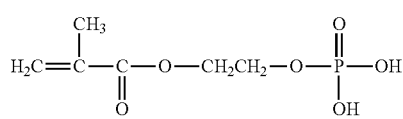

Formula 5

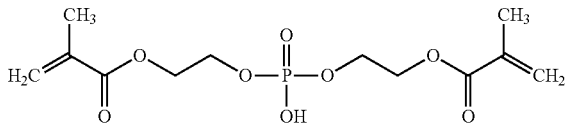

Formula 6

A content of the ionic liquid is from about 0.1 mol to about 5 mol, for example, from about 1 mol to about 5 mol, based on 1 mol of a lithium ion conductive compound including an ethylenically unsaturated bond, a lithium ion conductive unit, and an ion-exchangeable functional group. When a content of the ionic liquid is within this range, an ion conductivity of a polymer electrolyte is excellent.

As described above, a cross-linkable compound may be further included in a polymerization reaction for obtaining a polymerization product of a lithium ion conductive compound and a heteroatom containing ionic liquid.

The cross-linkable compound may include a functional group capable of polymerization with the lithium ion conductive compound and may have a hydrophilic property. In this regard, when the cross-linkable compound is hydrophilic, a lithium ion conducting pathway is additionally provided, physical properties of the final product after the cross-linking are enhanced, and its solubility in an organic solvent is reduced.

A functional group capable of polymerization with a lithium ion conductive compound refers to a functional group having a reactive unsaturated bond. The functional group may employ, for example, several substituents having a reactive double bond or a reactive triple bond. Examples of the functional group include a group having an unsaturated bond in a compound, such as alkyl acrylate, or alkyl methacrylate, a hydrocarbyl group having a double bond, such as a vinyl group or an allyl group, or a hydrocarbyl alkyl group having a triple bond, such as a propargyl group.

When the number of double bonds, which are reactive unsaturated bonds in a molecule is 2 or more, the cross-linkable compound may increase a shape maintaining ability of a polymer electrolyte obtained as a 3-dimensional network structure, which is formed by a reaction of the compound having the double bonds.

Examples of the cross-linkable compound may include a (meth)acrylic compound, such as glycidyl methacrylate, glycidyl acrylate, methoxydiethylene glycol methacrylate, methoxytriethylene glycol methacrylate, methoxypolyethylene glycol methacrylate methacryloyl isocyanate, 2-hydroxyethyl methacrylate, or N,N-dimethylaminoethyl methacrylate.

Examples of the compound having two or more reactive double bonds include divinylbenzene, divinylsulfone, allyl methacrylate, ethylene glycol dimethacrylate, diethylene glycol dimethacrylate, triethylene glycol dimethacrylate, polyethylene glycol dimethacrylate, 1,3-butylene glycol dimethacrylate, 1,6-hexanediol dimethacrylate, neopentyl glycol dimethacrylate, polypropylene glycol dimethacrylate, 2-hydroxy-1,3-dimethacryloxypropane, 2,2-bis-[4-(methacryloxyethoxy)phenyl]propane, 2,2-bis-[4-(methacryloxyethoxy·diethoxy)phenyl]propane, 2,2-bis-[4-(methacryloxyethoxy-polyethoxy)phenyl]propane, ethylene glycol diacrylate, diethylene glycol diacrylate, triethylene glycol diacrylate, polyethylene glycol diacrylate, 1,3-butylene glycol diacrylate, 1,6-hexanediol diacrylate, neopentyl glycol diacrylate, polypropylene glycol diacrylate, 2-hydroxy-1,3-diacryloxypropane, 2,2-bis-[4-(acryloxyethoxy)

phenyl]propane, 2,2-bis-[4-(acryloxyethoxy-diethoxy)phenyl]propane, 2,2-bis-[4-(acryloxyethoxy-polyethoxy)phenyl]propane, trimethylolpropane triacrylate, trimethylolpropane trimethacrylate, tetramethylolmethane triacrylate, tetramethylolmethane tetracrylate, water-soluble urethane diacrylate, water-soluble urethane dimethacrylate, tricyclodecanemethanol acrylate, hydrogen-added dicyclopentadiene diacrylate, polyester diacrylate, and polyester dimethacrylate.

The cross-linkable compound is a compound represented by Formula 7 or Formula 8.

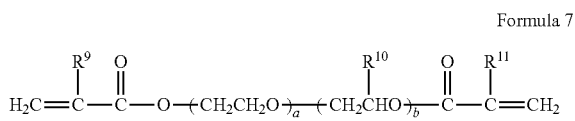

Formula 7

In Formula 7,
$R_9$ to $R_{11}$ are each independently a hydrogen atom, or a C1-C10 alkyl group,
a is an integer of 0 or 1 to 10, and
b is an integer of 0 or 1 to 10,
wherein a and b are both not 0; and

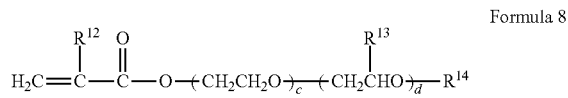

Formula 8

In Formula 8,
$R_{12}$ to $R_{14}$ are each independently a hydrogen atom, or a C1-C10 alkyl group,
c is an integer of 0 or 1 to 10, and
d is an integer of 0 or 1 to 10,
wherein c and d are both not 0.

In Formula 7, $R_9$ to $R_{11}$ are each independently a hydrogen atom or a C1-C6 alkyl group, such as a methyl group, an ethyl group, an n-propyl group, an iso-propyl group, an n-butyl group, an i-butyl group, an s-butyl group, or a t-butyl group, or for example, a C1-C4 alkyl group. Also, a and b are each independently, for example, an integer of 1 to 10.

In Formula 8, $R_{12}$ to $R_{14}$ are each independently a hydrogen atom or a C1-C6 alkyl group, such as a methyl group, an ethyl group, an n-propyl group, an i-propyl group, an n-butyl group, an i-butyl group, an s-butyl group, or a t-butyl group, or for example, a C1-C4 alkyl group. Also, c and d are each independently, for example, an integer of 1 to 10.

The cross-linkable compound is poly(ethyleneoxide)diacrylate represented by Formula 7a.

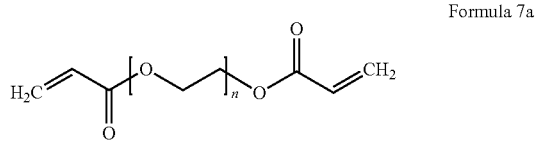

Formula 7a

In Formula 7a, n is an integer of 1 to 10.

A content of the cross-linkable compound is about 0.0001 part to 10 parts by weight, for example, about 2 parts to about 6 parts by weight, based on 100 parts by weight of the total weight of the lithium ion conductive compound including an ethylenically unsaturated bond, a lithium ion conductive unit, and an ion-exchangeable functional group and the ionic liquid.

When a content of the cross-linkable compound is within this range, mechanical properties and stability with respect to the electrolytic solution of the obtained polymer are excellent.

The polymer electrolyte according to an embodiment includes a lithium salt. In this regard, when the lithium salt is included in the polymer electrolyte, an ion conductivity of the polymer electrolyte improves.

Examples of the lithium salt include $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$ (where, x and y are a natural number), LiCl, LiI, $LiB(C_2O_4)_2$ (lithium bis(oxalato)borate; LiBOB), and a combination thereof, and the lithium salt is included as a supporting electrolyte salt.

A content of the lithium salt is from about 0.02 mol to about 3 mol, for example, from about 0.2 mol to about 3 mol, based on 1 mol of the lithium ion conductive compound containing an ethylenically unsaturated bond, a lithium ion conductive unit, and an ion-exchangeable functional group. When a content of the lithium salt is within this range, the polymer electrolyte has an appropriate conductivity and viscosity, and thus electrolyte performance may be excellent, and lithium ions may effectively move.

According to an embodiment, when anions of the lithium salt are the same with an anion $Y^-$ of the heteroatom containing ionic liquid described above, an ability of electrolyte compositions to mix may be excellent, and thus mechanical characteristics, ion conductivity, and physical and chemical stability with respect to an electrolytic solution of the polymer electrolyte obtained may be excellent.

The polymer electrolyte according to an embodiment may be manufactured to have a thickness of 100 micrometers (μm) or less, for example, from about 20 μm to about 100 μm. When a thickness of the polymer electrolyte is within this range, the polymer electrolyte, while securing a high ion conductivity, may have improved mechanical properties as the polymer electrolyte has a network structure by using a cross-linkable compound. Therefore, when a lithium metal negative electrode is used, a function of the polymer electrolyte suppressing dendrite formation may be excellent.

According to another aspect, provided is a polymer including a polymerization product of the lithium ion conductive compound including an ethylenically unsaturated bond, a lithium ion conductive unit, and an ion-exchangeable functional group; and the heteroatom containing ionic liquid capable of polymerizing with the lithium ion conductive compound.

The polymer may further include a cross-linkable compound in addition to the lithium ion conductive compound and the heteroatom containing ionic liquid. Here, a type and a content of the cross-linkable compound are the same as defined in the description of polymer electrolyte.

A polymer and polymer electrolyte may further contain a lithium salt. Bonding with a polymerizable ionic liquid may contain a considerably more lithium salt as a solid phase electrolyte. A type and a content of the lithium salt are the same as defined in the description of polymer electrolyte.

A weight average molecular weight of the polymer may be 10,000 Daltons (Da), for example, 100,000 Da or greater, for example, from about 50,000 Da to about 200,000 Da. A weight average molecular weight is measured by using a gel permeation chromatography (GPC). When a weight average molecular weight of the polymer is within this range, the polymer is stable with respect to an electrolyte solution, and chemical and physical characteristics of the polymer are excellent.

A process of preparing the polymer is as follows.

A lithium ion conductive compound including an ethylenically unsaturated bond, a lithium ion conductive unit, and an ion-exchangeable functional group; and a heteroatom-containing ionic liquid are dissolved in an organic solvent to obtain a composition for forming a polymer.

A polymerization is performed by applying heat or light to the composition for forming a polymer to obtain a desired polymer.

The process of applying heat may include a heat-treating process at a temperature from about 60° C. to about 120° C. When a temperature of the heat-treating process is within this range, a polymer with excellent chemical and physical characteristics may be obtained.

The process of applying light includes irradiating with ultraviolet light. A UV lamp may be used as the light source. According to an embodiment, a UV output may be in a range of about 0.5 kilowatts (kW) to about 1.5 kW, and an irradiation time is in a range of about 0.5 hours to about 3 hours.

The composition for forming a polymer includes a polymerization initiator. The polymerization initiator may be a thermal polymerization initiator or a photopolymerization initiator. Examples of the polymerization initiator include photopolymerization initiators, such as 2,2'-azobisisobutyronitrile (AIBN), benzoyl peroxide, acetophenone, trichloroacetophenone, 2-hydroxy-2-methylpropiophenone, 1-hydroxychlorohexylketone, benzoinether, 2,2-diethoxyacetophenone, and benzyldimethylketal; high-temperature thermal polymerization initiators, such as cumene hydroperoxide, t-butyl hydroperoxide, dicumyl peroxide, and di-t-butyl peroxide; thermal polymerization initiators, such as lauroyl peroxide, persulfate, 2,2'-azobis(2,4-dimethylvaleronitrile), and 2,2'-azobis(4-methoxy-2,4-dimethylvaleronitrile); low-temperature thermal polymerization initiators (redox initiator), such as hydrogen peroxide-ferrous salt•, persulfate-sodium metabisulfite, cumene hydroperoxide-ferrous salt, and benzoyl peroxide•dimethylaniline; peroxide•organometallic alkyl; triethylborane; and diethylzinc. The polymerization initiators may be used singularly or in a mixture, and a content of the polymerization initiator may be in a range of about 0.1 parts to about 1 part by weight, for example, about 0.1 parts to about 0.5 parts by weight, based on 100 parts by weight of the composition for forming a polymer electrolyte. When a content of the polymerization initiator is within this range, desired polymer may be obtained at a high yield without decrease in reactivity of polymerization.

Examples of the organic solvent include acrylonitrile, methylethylketone, acetonitrile, acetone, formamide, N,N-dimethyl formamide, tetrahydrofuran, methanol, ethanol, N-methyl-2-pyrrolidinone, dimethylsulfoxide. A content of the organic solvent may be from about 100 parts to about 3,000 parts by weight based on 100 parts by weight of the lithium ion conductive compound including an ethylenically unsaturated bond, a lithium ion conductive unit, and an ion-exchangeable functional group. When a content of the organic solvent is within this range, a polymer with excellent chemical and physical properties may be obtained.

Figure 2:
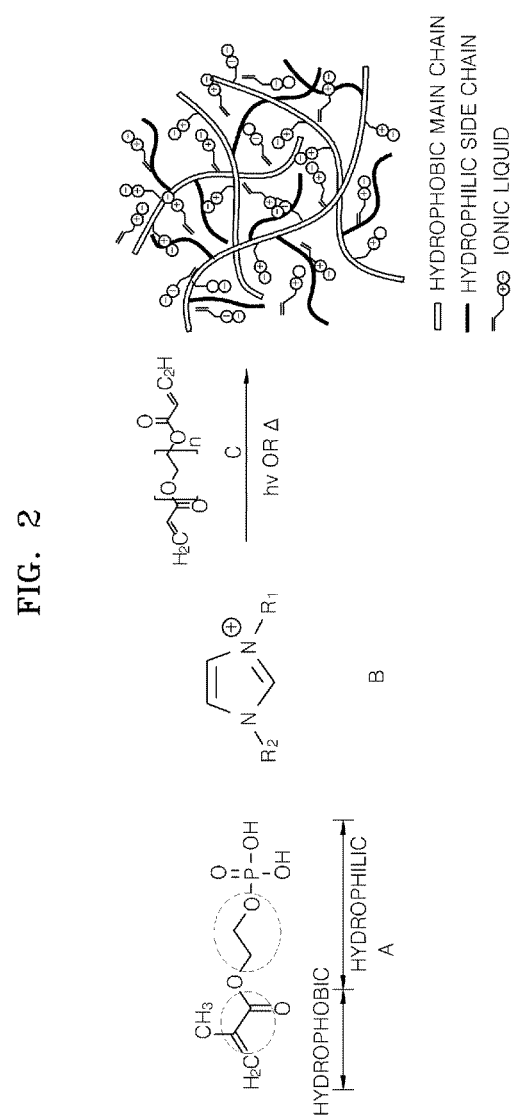
FIG. 2 illustrates a process of forming a polymer according to an embodiment.

FIG. 2 illustrates a process of forming a polymer according to an embodiment.

When a compound represented by Formula 5 is a lithium ion conductive compound A, a compound represented by Formula 3 is a heteroatom-containing ionic liquid B, and polyethylene oxide diacrylate represented by Formula 7a is a cross-linkable compound C, and light or heat is applied to a mixture of the lithium ion conductive compound A, heteroatom-containing ionic liquid B, and cross-linkable compound C to perform polymerization thereof, a main chain of a compound represented by Formula 5 forms a hydrophobic main chain, ethylene oxide forms a hydrophilic side chain, and thus a polymer having an interpenetration polymer network (IPN) structure is obtained.

Formula 3

In Formula 3, $R_1$ is a methyl group, a butyl group, an allyl group, or a vinyl group;

$R_2$ is a vinyl group or an allyl group; and $Y^-$ is at least one selected from $BF_4^-$, $Cl^-$, $Br^-$, $I^-$, $PF_6^-$, $ClO_4^-$, $CF_3SO_3^-$, $(CF_3SO_2)_2N^-$, $CF_3CO_2^-$, and $(C_2F_5SO_2)_2N^-$.

Formula 5

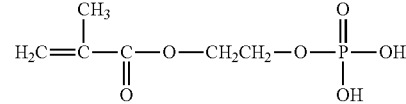

Formula 7a

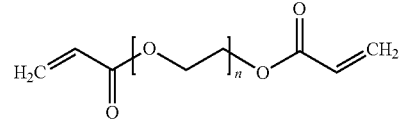

In Formula 7a, n is an integer of 1 to 10.

UV lamp is used as the light source. According to an embodiment, a UV output may be in a range of about 0.5 kW to about 1.5 kW, and an irradiation time of the light may be from about 0.5 hours to about 3 hours.

A polymer electrolyte according to an embodiment may be obtained by coating and drying the composition for forming a polymer electrolyte described in the process of manufacturing a polymer on a substrate and performing polymerization of the resultant. Here, the process may include separating the polymer electrolyte from the substrate. If the substrate is an electrode, a lithium battery may be manufactured without the process of separating the polymer electrolyte from the substrate.

The substrate may be a general support. The support may be a Mylar film, a polyethylene terephthalate film, and a glass substrate.

The coating process may be performed by using a casting method, a spraying method, a doctor blade method, a printing method, a spin-coating method, a dipping method, or a knife-coating method.

The drying process may be performed at a temperature in a range of room temperature (about 20° C.) to about 60° C.

The resultant of the coating and drying process is polymerized by applying heat or light.

The light applying process may be performed by irradiating UV light during the polymerization. An irradiation time of the light may vary depending on light intensity but may be, for example, from about 0.5 hours to about 3 hours.

The resultant may be remained at room temperature (20° C.) for about 1 hour to about 5 hours before irradiating the light. The heat applying process refers to a heat-treating process at a temperature from about 60° C. to about 120° C.

A polymer electrolyte for a lithium battery according to an embodiment may sufficiently facilitate lithium ion mobility and have an improved high temperature chemical resistance as movement of lithium ions becomes smooth and is a function of suppressing lithium dendrite formation even when a lithium metal negative electrode is used compared to a conventional polymer electrolyte. Also, the polymer electrolyte is a solid-type which does not leak and is an IPN-type electrolyte, which contains a large amount of ionic liquid that improves a lithium ion transfer rate. Also, solubility of the polymer in an organic solvent in long-term use is reduced, and thus the polymer electrolyte has an excellent stability with respect to an electrolytic solution including the organic solvent.

Also, according to another aspect, provided is a negative electrode protection layer for a lithium battery, wherein the negative electrode protection layer includes a polymer, which is a polymerization product of a lithium ion conductive compound including an ethylenically unsaturated bond, a lithium ion conductive unit, and an ion-exchangeable functional group; and a heteroatom-containing ionic liquid as described above.

A negative electrode may be a lithium metal electrode. When the lithium metal electrode is used, a negative electrode protection layer for protecting the lithium metal electrode from an electrolyte is necessary. If the polymer described above is used while preparing the negative electrode protection layer, an ability of suppressing lithium dendrite formation improves, and the lithium negative electrode may have excellent stability with respect to the electrolytic solution.

A thickness of the negative electrode protection layer containing the polymer is in a range of about 5 μm to about 20 μm. According to another aspect, provided is a lithium battery including a negative electrode; a positive electrode; and the polymer electrolyte.

Also, according to another aspect, a lithium battery having the negative electrode protection layer may be provided.

The lithium battery may be a lithium secondary battery using, for example, a lithium metal.

The negative electrode may include a material capable of reversible intercalation/deintercalation of lithium ions, a lithium metal, an alloy of a lithium metal, a material capable of doping or de-doping lithium, or a transition metal oxide as a negative electrode active material.

The positive electrode may include a material capable of reversible intercalation/deintercalation of lithium ions as a positive electrode active material.

The lithium battery may include a separator in addition to the polymer electrolyte.

The separator may have a mixed multi-layer structure, such as a 2-layer separator of polyethylene/polypropylene, a 3-layer of polyethylene/polypropylene/polyethylene, or a 3-layer of polypropylene/polyethylene/polypropylene.

Hereinafter, a process of manufacturing a lithium battery by using a polymer electrolyte will be described, and a method of manufacturing a lithium battery having a positive electrode, a negative electrode, and a polymer electrolyte will be described.

The positive electrode and the negative electrode are manufactured by coating and drying a composition for forming a positive electrode active material layer and a composition for forming a negative electrode active material layer, each respectively, on a current collector.

The composition for forming a positive electrode active material layer is prepared by mixing a positive electrode active material, a conductive material, a binder, and a solvent.

The positive electrode active material may be a compound capable of reversible intercalation/deintercalation of lithium (a lithiated intercalation compound).

The positive electrode active material may be at least one selected from a lithium cobalt oxide represented by formula $LiCoO_2$; a lithium nickel oxide represented by formula $LiNiO_2$; a lithium manganese oxide represented by formula $Li_{1+x}Mn_{2-x}O_4$ (where, x is from 0 to 0.33), $LiMnO_3$, $LiMn_2O_3$, or $LiMnO_2$; a lithium copper oxide represented by formula $Li_2CuO_2$; a lithium iron oxide represented by formula $LiFe_3O_4$; a lithium vanadium oxide represented by formula $LiV_3O_8$; a copper vanadium oxide represented by formula $Cu_2V_2O_7$; a vanadium oxide represented by formula $V_2O_5$; Ni-site type lithium nickel oxides of formula $LiNi_{1-x}M_xO_2$ (where, M is Co, Mn, Al, Cu, Fe, Mg, B, or Ga, x is from 0.01 to 0.3); a lithium manganese composite oxide of formula $LiMn_{2-y}M_yO_2$ (where, M is Co, Ni, Fe, Cr, Zn, or Ta, and y is from 0.01 to 0.1), or formula $Li_2Mn_3MO_8$ (where, M is Fe, Co, Ni, Cu, or Zn); a lithium manganese oxide of formula $LiMn_2O_4$, wherein a portion of Li is substituted with alkaline earth metal ions; a disulfide compound; and an iron molybdenum oxide of formula $Fe_2(MoO_4)_3$.

The positive electrode active material may be, for example, a mixture of a lithium cobalt oxide and a lithium nickel cobalt manganese oxide.

The binder for a positive electrode may be a binder composition according to an embodiment, or any material that is capable of attaching positive electrode active material particles or capable of attaching the positive electrode active material to a current collector. The binder may be at least one selected from polyvinylalcohol, carboxymethylcellulose, hydroxypropylcellulose, diacetylcellulose, polyvinylchloride, carboxylated polyvinylchloride, polyvinylfluoride, a polymer including ethylene oxide, polyvinylpyrrolidone, polyurethane, polytetrafluoroethylene, polyvinylidene fluoride, polyethylene, polypropylene, styrene-butadiene rubber, acrylated styrene-butadiene rubber, epoxy resin, and nylon.

The positive electrode active material may be at least one selected from a lithium cobalt oxide, a lithium nickel cobalt manganese oxide, a lithium nickel cobalt aluminum oxide, a lithium iron phosphate, and a lithium manganese oxide, but is not limited thereto, and any positive electrode active material available in the art may be used.

For example, the positive electrode active material may be a compound represented by a formula selected from $Li_aA_{1-b}B_bD_2$ (where, $0.90 \leq a \leq 1.8$ and $0 \leq b \leq 0.5$); $Li_aE_{1-b}B_bO_{2-c}D_c$ (where, $0.90 \leq a \leq 1.8$, $0 \leq b \leq 0.5$, and $0 \leq c \leq 0.05$); $LiE_{2-b}B_bO_{4-c}D_c$ (where, $0 \leq b \leq 0.5$ and $0 \leq c \leq 0.05$); $Li_aNi_{1-b-c}Co_bB_cD_\alpha$ (where, $0.90 \leq a \leq 1.8$, $0 \leq b \leq 0.5$, $0 \leq c \leq 0.05$, and $0 < \alpha \leq 2$); $Li_aNi_{1-b-c}CO_bB_cO_{2-\alpha}F_\alpha$ (where, $0.90 \leq a \leq 1.8$, $0 \leq b \leq 0.5$, $0 \leq c \leq 0.05$, and $0 < \alpha < 2$); $Li_aNi_{1-b-c}Co_bB_cO_{2-\alpha}F_2$ (where, $0.90 \leq a \leq 1.8$, $0 \leq b \leq 0.5$, $0 \leq c \leq 0.05$, and $0 < \alpha < 2$); $Li_aNi_{1-b-c}Mn_bB_cD_\alpha$ (where, $0.90 \leq a \leq 1.8$, $0 \leq b \leq 0.5$, $0 \leq c \leq 0.05$, and $0 < \alpha \leq 2$); $Li_aNi_{1-b-c}Mn_bB_cO_{2-\alpha}F_\alpha$ (where, $0.90 \leq a \leq 1.8$, $0 \leq b \leq 0.5$, $0 \leq c \leq 0.05$, and $0 < \alpha < 2$); $Li_aNi_{1-b-c}Mn_bB_cO_{2-\alpha}F_2$ (where, $0.90 \leq a \leq 1.8$, $0 \leq b \leq 0.5$, $0 \leq c \leq 0.05$, and $0 < \alpha < 2$); $Li_aNi_bE_cG_dO_2$ (where, $0.90 \leq a \leq 1.8$, $0 \leq b \leq 0.9$, $0 \leq c \leq 0.5$, and $0.001 \leq d \leq 0.1$); $Li_aNi_bCo_cMn_dG_eO_2$ (where, $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (where, $0.90 \leq a \leq 1.8$, and $0.001 \leq b \leq 0.1$); $Li_a$-

$CoG_bO_2$ (where, $0.90 \le a \le 1.8$ and $0.001 \le b \le 0.1$); $Li_aMnG_bO_2$ (where, $0.90 \le a \le 1.8$ and $0.001 \le b \le 0.1$); $Li_aMn_2G_bO_4$ (where, $0.90 \le a \le 1.8$ and $0.001 \le b \le 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ ($0 \le f \le 2$); $Li_{(3-f)}Fe_2(PO_4)_3$ ($0 \le f \le 2$); and $LiFePO_4$.

In the formulae above,

A is Ni, Co, Mn, or a combination thereof;

B is Al, Ni, Co, Mn, Cr, Fe, Mg, Sr, V, a rare earth element or a combination thereof;

D is O, F, S, P, or a combination thereof;

E is Co, Mn, or a combination thereof;

F is F, S, P, or a combination thereof;

G is Al, Cr, Mn, Fe, Mg, La, Ce, Sr, V, or a combination thereof;

Q is Ti, Mo, Mn, or a combination thereof;

I is Cr, V, Fe, Sc, Y, or a combination thereof; and

J is V, Cr, Mn, Co, Ni, Cu, or a combination thereof.

The compound may have a coating layer on a surface thereof, or the compound may be mixed with a compound having a coating layer. The coating layer may include a coating element compound of an oxide or a hydroxide of a coating element, an oxyhydroxide of a coating element, an oxycarbonate of a coating element, or a hydroxycarbonate of a coating element. The compound forming the coating layer may be amorphous or a crystalline. A coating element included in the coating layer may be Mg, Al, Co, K, Na, Ca, Si, Ti, V, Sn, Ge, Ga, B, As, Zr, or a mixture thereof. A process of forming the coating layer may be carried out by adding the elements into the compound by using a method (e.g., spray-coating or dipping) that does not negatively affect properties of the positive electrode active material. This process may be easily understood by one of ordinary skill in the art, and thus the detailed description thereof is omitted herein.

The binder is a composition that contributes binding with an active material and a conductive material and binding with a current collector. Thus, an amount of the binder added is from about 1 part to about 50 parts by weight based on 100 parts by weight of the total weight of the positive electrode active material. Examples of the binder include polyvinylidene fluoride (PVDF), polyvinyl alcohol, carboxymethylcellulose (CMC), starch, hydroxypropylcellulose, reproduced cellulose, polyvinylpyrrolidone, polytetrafluoroethylene, polyethylene, polypropylene, ethylene-propylene-diene terpolymer (EPDM), sulfonated EPDM, styrene butadiene rubber, fluorine rubber, and various copolymers. A content of the binder is from about 2 parts to about 5 parts by weight based on 100 parts by weight of the total weight of the positive electrode active material. When a content of the binder is within this range, a binding force of the active material layer with respect to the current collector is satisfactory.

The conductive material may be any material that does not cause chemical change in the battery and have conductivity. Examples of the conductive material include graphite such as natural graphite or artificial graphite; carbon blacks, such as carbon black, acetylene black, Ketjen black, channel black, furnace black, lamp black, or summer black; conductive fibers, such as carbon fibers or metal fibers; carbon fluoride; metal powder, such as aluminum or nickel powder; conductive whisky, such as zinc oxide or potassium titanate; a conductive metal oxide, such as a titanium oxide; and a conductive polymer, such as a polyphenylene derivative. Thus, examples of the conductive material may include carbon black, graphite granules, acetylene black, Ketjen black, carbon fibers, carbon nanotubes; a metal powder, metal fiber, or metal tube of copper, nickel, aluminum, or silver; and a conductive polymer, such as a polyphenylene derivative, but are not limited thereto, and any conductive material known in the art may be used.

A content of the conducting material may be from about 1 part to about 10 parts by weight, for example, from about 1 parts to about 5 parts by weight based on 100 parts by weight of the total weight of the positive electrode active material. When a content of the conducting material is within this range, the finally obtained electrode may have excellent conductivity characteristic.

Examples of the solvent include N-methylpyrrolidone, N,N-dimethyl formamide (DMF), N,N-dimethyl acetamide (DMA), and dimethylsulfoxide (DMSO).

A content of the solvent is from about 100 parts to about 2,000 parts by weight based on 100 parts by weight of the positive electrode active material. When a content of the solvent is within this range, a process for forming the active material layer may be readily carried out. A thickness of the positive electrode current collector is from about 3 μm to about 500 μm, and any current collector that does not cause chemical change in the battery and has a high conductivity may be used. For example, the positive electrode current collector may be, for example, stainless steel, aluminum, nickel, titanium, heat-treated carbon, or aluminum or stainless steel, wherein a surface thereof is treated with carbon, nickel, titanium, or silver. The current collector may form fine bumps on a surface thereof to increase an adhesive strength of the positive electrode active material and may be used in various forms, such as a film, a sheet, a foil, a net, a porous structure, a foam structure, or a non-woven structure.

Also, a negative electrode active material, a binder, a conductive material, and a solvent may be mixed to prepare a composition for forming a negative electrode active material layer. The negative electrode active material is a material capable of intercalating and deintercalating lithium ions. Examples of the negative electrode active material include a carbon-based material, such as graphite or carbon, a lithium metal, an alloy of a lithium metal, and a silicon oxide-based material. In some embodiments, the negative electrode active material is a silicon oxide.

The carbon-based material may be crystalline carbon, amorphous carbon, or a mixture thereof. Examples of the crystalline carbon include graphite, such an as non-shaped, plate-shaped, flake-shaped, sphere, or fibrous natural graphite or artificial graphite, and examples of the amorphous carbon include soft carbon (carbon heat treated at a relatively low temperature) or hard carbon, mesophase pitch carbonization product, heat-treated cokes, graphene, carbon black, fullerene soot, carbon nanotubes, and carbon fibers, but the carbon-based material is not limited thereto, and any carbon-based material available in the art may be used.

A content of the added binder is from about 1 part to about 50 parts by weight based on 100 parts by weight of the total weight of the negative electrode active material. Examples of the binder may be the same with the examples of the positive electrode.

An amount of the conductive material may be from about 1 part to about 10 parts by weight, for example, from about 1 part to about 5 parts by weight based on 100 parts by weight of the total weight of the negative electrode active material. When an amount of the conductive material is within this range, the finally obtained electrode may have excellent conductivity characteristics.

An amount of the solvent may be from about 100 parts to about 2,000 parts by weight based on 100 parts by weight of the total weight of the negative electrode active material.

When an amount of the solvent is within this range, a process for forming the negative electrode active material layer may be easily carried out.

The conductive material and the solvent may be the same materials with those used in the preparation of the positive electrode.

In general, a thickness of the negative electrode current collector is from about 3 μm to about 500 μm. The negative electrode current collector may be any material that does not cause chemical change in the battery and has some conductivity. Examples of the negative electrode current collector include copper, stainless steel, aluminum, nickel, titanium, heat-treated carbon, copper or stainless steel, wherein a surface thereof is treated with carbon, nickel, titanium, or silver, and an aluminum-cadmium alloy. Also, as the positive current collector, the negative electrode current collector may form fine bumps on a surface thereof to enhance an adhesive strength of the negative electrode active material, and may be used in various forms, such as a film, a sheet, a foil, a net, a porous structure, a foam structure, or a non-woven structure.

The negative electrode may have a negative electrode protection layer containing a polymer that is a polymerization product of a lithium ion conductive compound including an ethylenically unsaturated bond, lithium conductive unit, and an ion-exchangeable functional group; and a heteroatom-containing ionic liquid.

The polymer electrolyte prepared in the manner as the process described above is disposed between the positive electrode and the negative electrode. Here, the polymer electrolyte may serve as a separating layer.

A separator may be further included in the battery in addition to the polymer electrolyte.

A pore diameter of the separator is generally from about 0.01 μm to about 10 μm, and a thickness of the separator is from about 5 μm to about 20 μm. Examples of the separator include, for example, an olefin-based polymer such as chemically resistant and hydrophobic polypropylene; and a sheet or non-woven fabric formed of glass fibers or polyethylene. Examples of the olefin-based polymer include polyethylene, polypropylene, polyvinylidene fluoride or a multi-layer including two or more layers thereof, and a mixed multi-layer, such as a 2-layer separator of polyethylene/polypropylene, a 3-layer separator of polyethylene/polypropylene/polyethylene, or a 3-layer separator of polypropylene/polyethylene/polypropylene.

The lithium battery may be, for example, a lithium metal secondary battery for a vehicle, a lithium air secondary battery for an electrical vehicle (EV), or a lithium sulfur secondary battery.

A lithium battery according to an embodiment may be used according to its appropriate use, such as a main power source of a video camera, a laptop computer, a mobile phone, and PHS (personal handyphone service), a back-up power use of a memory, a power source for alternative in case of instantaneous black-out of a PC, application to an EV or a hybrid vehicle, or a solar power generation energy storage system that is used together with a solar battery.

Hereinafter are definitions of substituents used in the chemical formulae.

The term "alkyl" as used herein in a chemical formula refers to a group derived from a fully saturated branched or unbranched (or straight chain or linear) hydrocarbon.

Examples of the "alkyl" include methyl, ethyl, n-propyl, iso-propyl, n-butyl, iso-butyl, sec-butyl, n-pentyl, iso-pentyl, neo-pentyl, n-hexyl, 3-methylhexyl, 2,2-dimethylpentyl, 2,3-dimethyl pentyl, and n-heptyl.

At least one hydrogen atom in the "alkyl" may be substituted with a halogen atom, a C1-C20 alkyl group (e.g.: $CF_3$, $CHF_2$, $CH_2F$, or $CCl_3$) substituted with a halogen atom, a C1-C20 alkoxy group, a C2-C20 alkoxyalkyl group, a hydroxyl group, a nitro group, a cyano group, an amino group, an amidino group, a hydrazine group, a hydrazone group, a carboxylic acid group or a salt thereof, a sulfonyl group, a sulfamoyl group, a sulfonic acid group or a salt thereof, a phosphoric acid group or a salt thereof, or a C1-C20 alkyl group, a C2-C20 alkenyl group, a C2-C20 alkynyl group, a C1-C20 heteroalkyl group, a C6-C20 aryl group, a C7-C20 arylalkyl group, a C6-C20 heteroaryl group, a C7-C20 heteroarylalkyl group, a C6-C20 heteroaryloxy group, a C6-C20 heteroaryloxyalkyl group, or a C6-C20 heteroarylalkyl group.

The term "halogen atom" as used herein in a chemical formula includes fluorine, bromine, chlorine, and iodine.

The term "a C1-C20 alkyl group substituted with a halogen atom" as used herein in a chemical formula refers to a C1-C20 alkyl group that is substituted with at least one halogen atom, and examples of the "C1-C20 alkyl group substituted with a halogen atom" include monohaloalkyl or polyhaloalkyl including dihaloalkyl or perhaloalkyl. The monohaloalkyl includes one iodine, bromine, chlorine, or fluorine in the alkyl group, and polyhaloalkyl denotes an alkyl group having at least two halogen atoms that are identical to or different from each other.

The term "alkoxy" as used herein in a chemical formula refers to "alkyl-O—", wherein the term "alkyl" has the same meaning as described above. Examples of the alkoxy include methoxy, ethoxy, n-propoxy, iso-propoxy, n-butoxy, iso-butoxy, sec-butoxy, tert-butoxy, pentyloxy, and hexyloxy. In the alkoxy group, at least one hydrogen atom may be substituted with the same groups as described above in connection with the alkyl group.

The term "alkylamino" as used herein in a chemical formula refers to "alkyl-N($R^{101}$)—", wherein the term "alkyl" has the same meaning as described above and $R^{101}$ is a hydrogen atom or a C1-C20 alkyl group. Examples of the alkylamino include methylamino, ethylamino, n-propylamino, iso-propylamino, n-butylamino, iso-butylamino, sec-butylamino, tert-butylamino, pentylamino, and hexylamino. In the alkylamino group, at least one hydrogen atom may be substituted with the same groups as described above in connection with the alkyl group.

The term "hydroxyalkyl" as used herein in a chemical formula refers to "HO-alkyl-", wherein the term "alkyl" has the same meaning as described above. Examples of hydroxyalkyl include hydroxymethyl and hydroxyethyl.

The term "hydroxyalkylamino" as used herein in a chemical formula refers to "HO-alkylamino-", wherein the term "alkylamino" has the same meaning as described above. Examples of hydroxyalkylamino include hydroxyethylamino.

The term "alkoxyalkyl" as used herein in a chemical formula refers to an alkyl group substituted with the alkoxy group described above. At least one hydrogen atom of the alkoxyalkyl may be substituted with the same groups as described above in connection with the alkyl group. The term "alkoxyalkyl" includes an alkoxyalkyl moiety.

The term "alkenyl" as used herein in a chemical formula refers to a branched or non-branched hydrocarbon group having at least one carbon-carbon double bond. Examples of the alkenyl group include vinyl, allyl, butenyl, iso-propenyl, and iso-butenyl. At least one hydrogen atom of the alkenyl group may be substituted with the same groups as described above in connection with the alkyl group.

The term "alkynyl" as used herein in a chemical formula refers to a branched or non-branched hydrocarbon group having at least one carbon-carbon triple bond. Examples of the alkynyl group include ethynyl, butynyl, iso-butynyl, and iso-propynyl.

At least one hydrogen atom of the alkynyl group may be substituted with the same groups as described above in connection with the alkyl group.

The term "aryl" as used herein in a chemical formula refers to an aromatic hydrocarbon group that may be used alone or in a combination and includes at least one ring.

The term "aryl" includes a group, wherein an aromatic ring is fused with one or more cycloalkyl rings. Examples of the aryl may be phenyl, naphthyl, and tetrahydronaphthyl. Also, at least one hydrogen atom in the aryl group may be substituted with the same groups as described above in connection with the alkyl group.

The term "arylalkyl" as used herein in a chemical formula refers to an alkyl group substituted with an aryl group. Examples of the arylalkyl include benzyl and phenyl-$CH_2CH_2$—.

The term "aryloxy" as used herein in a chemical formula refers to O-aryl, and examples of the aryloxy group include phenoxy. At least one hydrogen atom in the aryloxy group may be substituted with the same groups as described above in connection with the alkyl group.

The term "heteroaryl" as used herein in a chemical formula refers to a monocyclic or bicyclic organic group including at least one heteroatom selected from nitrogen (N), oxygen (O), phosphorus (P), and sulfur (S), and the remaining ring atoms are carbon (C). For example, the heteroaryl group may include 1 to 5 heteroatoms and may include 5 to 10 ring members, wherein S or N may be present in various oxidation states. Examples of heteroaryl group include pyridyl, pyrrolyl, pyrimidinyl, and imidazolyl.

At least one hydrogen atom in the heteroaryl group may be substituted with the same groups as described above in connection with the alkyl group.

The term "heteroarylalkyl" as used herein in a chemical formula refers to an alkyl group substituted with heteroaryl.

The term "heteroaryloxy" as used herein in a chemical formula refers to a O-heteroaryl moiety. At least one hydrogen atom in the heteroaryloxy group may be substituted with the same groups as described above in connection with the alkyl group.

The term "heteroaryloxyalkyl" as used herein in a chemical formula denotes an alkyl group substituted with heteroaryloxy. At least one hydrogen atom in the heteroaryloxyalkyl group may be substituted with the same groups as described above in connection with the alkyl group.

The term "cycloalkyl" or "carbon ring" as used herein in a chemical formula refers to a saturated or partially unsaturated non-aromatic monocyclic, bicyclic, or tricyclic hydrocarbon group.

Examples of the monocyclic hydrocarbon group include cyclopentyl, cyclopentenyl, cyclohexyl, and cyclohexenyl, and examples of the bicyclic hydrocarbon group include bornyl, decahydronaphthyl, bicyclo[2.1.1]hexyl, bicyclo[2.2.1]heptyl, bicyclo[2.2.1]heptenyl, and bicyclo[2.2.2]octyl.

Examples of the tricyclic hydrocarbon group include adamantyl.

At least one hydrogen atom in the "carbon ring" may be substituted with the same groups as described above in connection with the alkyl group.

The term "a heterocyclic ring" group, or a "heterocycloalkyl" group as used herein in a chemical formula refers to a ring group composed of 5 to 10 atoms containing a heteroatom, such as nitrogen (N), sulfur (S), phosphor (P), or oxygen (O). An example of the heterocyclic ring group is piperidine group, and at least one hydrogen atom in the "heterocyclic ring group" or the "heterocycloalkyl group" may be substituted with the same groups as described above in connection with the alkyl group.

The term "heterocyclicoxy" or "heterocycloxy" as used herein in a chemical formula denotes a O-heterocyclic ring or a O-heterocycloalkyl group, and at least one hydrogen atom in the "heterocyclicoxy" group or the "heterocycloxy" group may be substituted with the same groups as described above in connection with the alkyl group.

The term "sulfonyl" as used herein in a chemical formula denotes R"—$SO_2$—, wherein R" is a hydrogen atom, alkyl, aryl, heteroaryl, aryl-alkyl, heteroaryl-alkyl, alkoxy, aryloxy, cycloalkyl group, or a heterocyclic ring group.

The term "sulfamoyl" used herein in a chemical formula denotes $H_2NS(O_2)$—, alkyl-$NHS(O_2)$—, (alkyl)$_2NS(O_2)$—, aryl-$NHS(O_2)$—, alkyl-(aryl)-$NS(O_2)$—, (aryl)$_2NS(O)_2$, heteroaryl-$NHS(O_2)$—, (aryl-alkyl)-$NHS(O_2)$—, or (heteroaryl-alkyl)-$NHS(O_2)$—. At least one hydrogen atom in the "sulfamoyl group" may be substituted with the same groups as described above in connection with the alkyl group.

The term "amino group" used herein in a chemical formula includes a nitrogen atom that is covalently bonded to at least one carbon atom or heteroatom. The amino group includes —$NH_2$ and substituted moieties. Also, examples of the amino group include an alkylamino group, in which a nitrogen atom is attached to at least one additional alkyl group, and an aryl amino group or a diarylamino group, in which a nitrogen atom is attached to at least one or two independently selected aryl groups.

Hereinafter, the examples will be described in detail. However the examples are for illustrative purposes only and are not intended to limit the scope of the present disclosure.

Example 1: Preparation of Polymer Electrolyte 2 mmol of a compound represented by Formula 5, 1 mmol of 1-allyl-3-methylimidazolium bis(trifluoromethylsulfonyl)imide represented by Formula 3a, 0.02 g (5% mol) of AIBN as a photopolymerization initiator, 3 mmol of lithium bis-(trifluoromethane sulfonyl)imide (LiTFSI), and acetonitrile were mixed to obtain a polymer electrolyte composition. A content of acetonitrile in the polymer electrolyte composition was about 300 parts by weight based on 100 parts by weight of the compound represented by Formula 5.

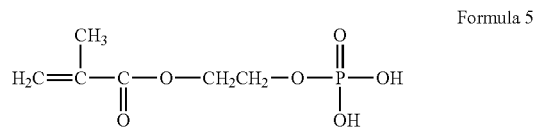

Formula 5

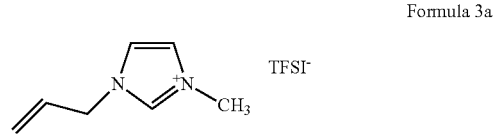

Formula 3a

TFSI is bis(trifluoromethylsulfonyl)imide.

The composition was casted on a Teflon dish and dried at room temperature (20° C.) for 2 hours. The dried resultant was put to a UV curing system (UV output: about 1 kW) and UV-cured for 1 hour. The cured resultant was remained at room temperature (20° C.) for 4 hours and dried at a temperature of 60° C. for 12 hours to obtain a polymer electrolyte.

Example 2: Preparation of Polymer Electrolyte

A polymer electrolyte was prepared in the same manner as in Example 1, except that 3 mmol of a compound represented by Formula 6 is used instead of 2 mmol of the compound represented by Formula 5.

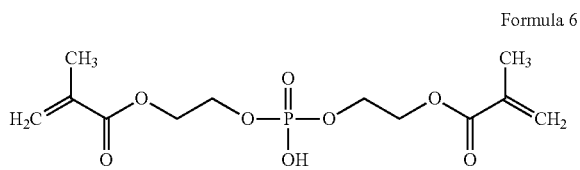 [SMILES: C=C(C)C(=O)OCCOP(=O)(O)OCCOC(=O)C(=C)C]

Formula 6

Example 3: Preparation of Polymer Electrolyte

A polymer electrolyte was prepared in the same manner as in Example 1, except that 4 mmol of LiTFSI was used instead of 3 mmol of LiTFSI.

Example 4: Preparation of Polymer Electrolyte

A polymer electrolyte was prepared in the same manner as in Example 1, except that 1 mmol of 1-allyl-3-butylimidazolium bis(trifluoromethylsulfonyl)imide represented by Formula 3b was used instead of 1 mmol of 1-allyl-3-methylimidazolium bis(trifluoromethylsulfonyl)imide represented by Formula 3a.

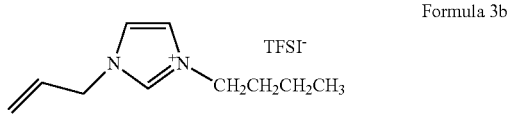

Formula 3b

Example 5: Preparation of Polymer Electrolyte

A polymer electrolyte was prepared in the same manner as in Example 4, except that 3 mmol of a compound represented by Formula 6 was used instead of 2 mmol of the compound represented by Formula 5.

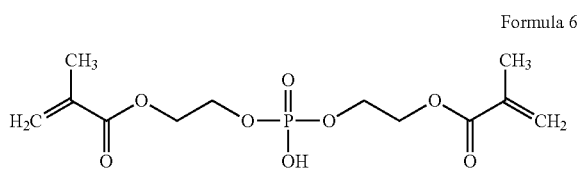 [SMILES: C=C(C)C(=O)OCCOP(=O)(O)OCCOC(=O)C(=C)C]

Formula 6

Example 6: Preparation of Polymer Electrolyte

A polymer electrolyte was prepared in the same manner as in Example 1, except that 0.5 part by weight of polyethyleneoxidediacrylate represented by Formula 7a based on 100 parts by weight of the total weight of the compound represented by Formula 5 and the compound represented by Formula 3a was added to the polymer electrolyte composition to perform polymerization.

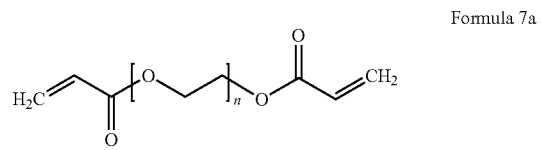

Formula 7a

In Formula 7a, n is about 5.

Comparative Example 1: Preparation of Polymer Electrolyte

A polymer electrolyte was prepared by mixing 20 mol of polyethyleneoxide and 1 mol of LiTFSI.

Comparative Example 2: Preparation of Polymer Electrolyte

A polymer electrolyte was prepared by mixing 2 mol of the compound represented by Formula 5 and 1 mol of LiTFSI.

Evaluation Example 1: $^1$H-NMR Analysis $^1$H-NMR analyses were performed on the compound represented by Formula 5, 1-allyl-3-methylimidazolium bis(trifluoromethylsulfonyl)imide represented by Formula 3a, i.e., the starting materials used in Example 1, and a polymerization product thereof. Here, the $^1$H-NMR analyses were performed by using NMR 600 MHz (AVANCE III) available from Bruker.

A solvent for dissolving the compound represented by Formula 5 and 1-allyl-3-methylimidazolium bis(trifluoromethylsulfonyl)imide represented by Formula 3a was CDCl$_3$.

Figure 3:
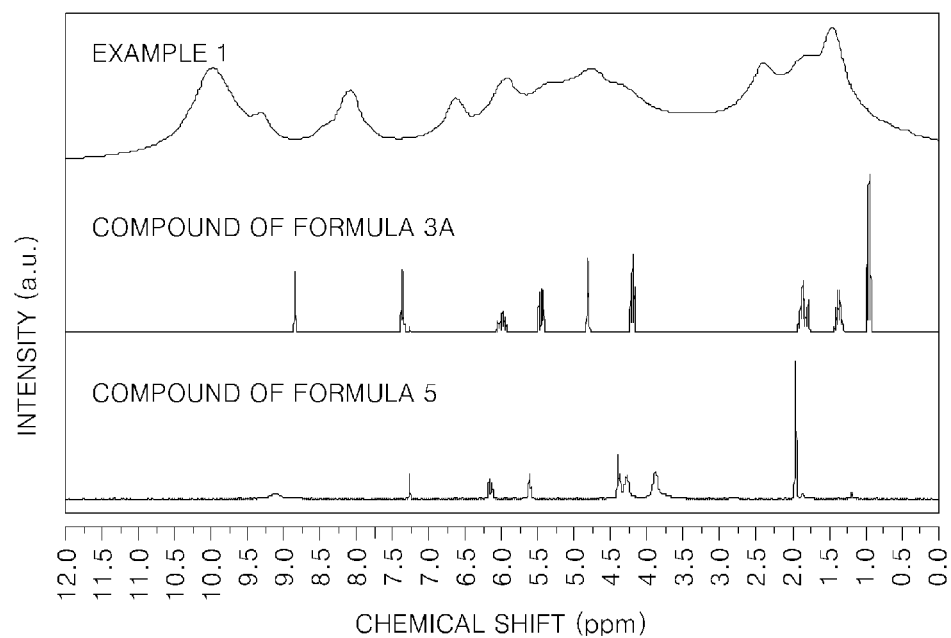
FIG. 3 is a graph of intensity (arbitrary unit, a. u.) versus chemical shift (parts per million, ppm), which is a proton nuclear magnetic resonance ($^1$H-NMR) spectrum of a polymer prepared in Example 1 and a starting material for forming the polymer.

The analysis results are shown in FIG. 3. Referring to FIG. 3, $^1$H-NMR of the polymerization product has a peak pattern different from that of $^1$H-NMR of the compound of Formula 5 and the compound of Formula 3a, i.e., the starting materials.

Evaluation Example 2: $^{13}$C-NMR Analysis $^{13}$C-NMR analyses were performed on the compound represented by Formula 5,1-allyl-3-methylimidazolium bis(trifluoromethylsulfonyl)imide represented by Formula 3a, i.e., the starting materials used in Example 1, and a polymerization product thereof. Here, the $^{13}$C-NMR analyses were performed by using NMR 600 MHz (AVANCE III) available from Bruker.

Figure 4:
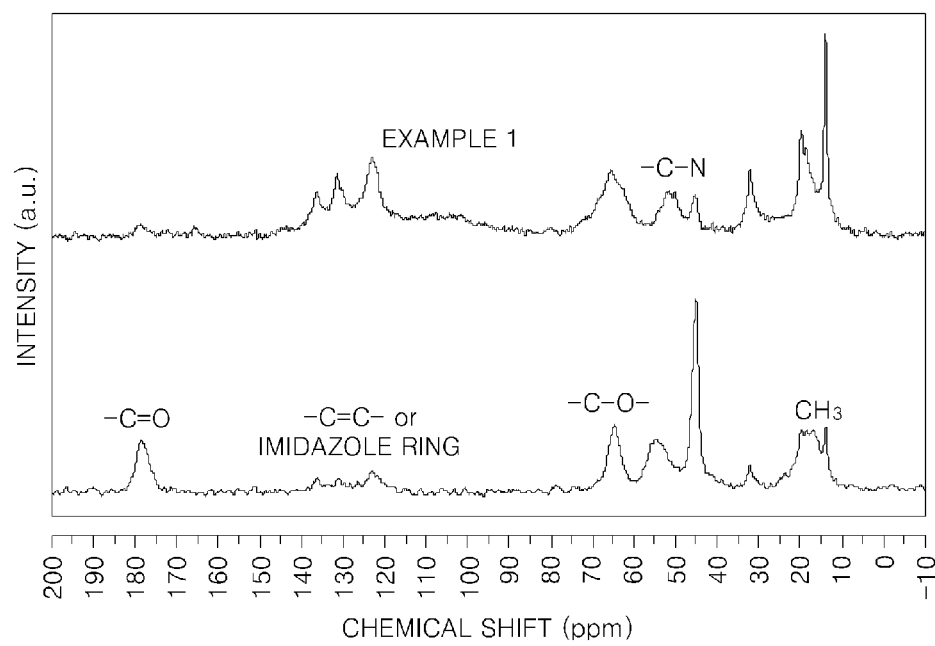
FIG. 4 is a graph of intensity (arbitrary unit, a. u.) versus chemical shift (parts per million, ppm), which is a carbon nuclear magnetic resonance ($^{13}$C-NMR) spectrum of the polymer prepared in Example 1 and a starting material for forming the polymer.

Referring to FIG. 4, formation of the polymerization product was confirmed as the significant peak of the compound represented by Formula 5 disappeared in the case of the product obtained therefrom.

Evaluation Example 3: IR Analysis

IR analyses were performed on the compound represented by Formula 5, 1-allyl-3-methylimidazolium bis(trifluoromethylsulfonyl)imide represented by Formula 3a, i.e., the starting materials used in Example 1, and a polymerization product thereof. Here, the IR analyses were performed by using VERTEX70 attached with Excalibur ATR accessory available from Bruker.

Figure 5:
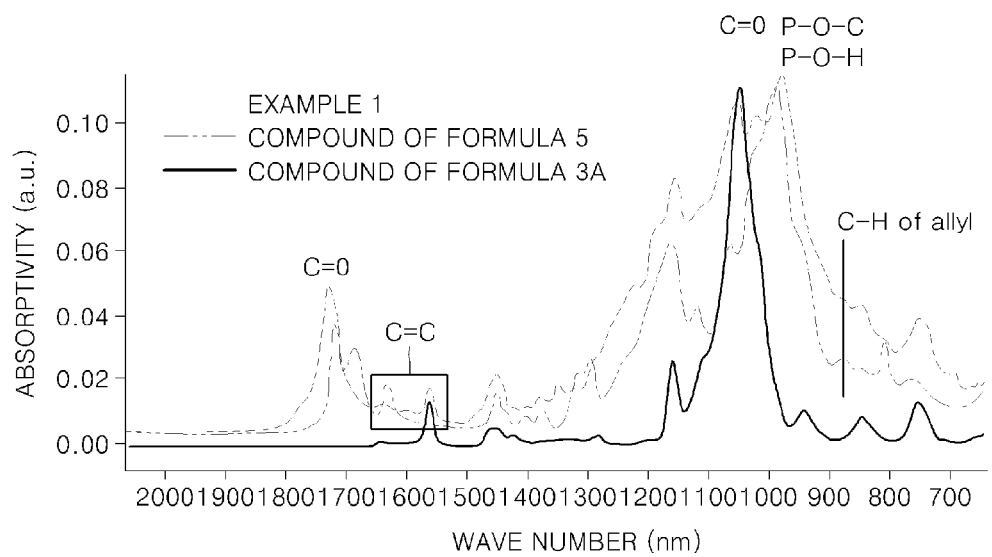
FIG. 5 is a graph of absorptivity (arbitrary unit, a. u.) versus wave number (nanometers, nm), which is an infrared (IR) spectrum of the polymer prepared in Example 1 and a starting material for forming the polymer.

The IR analyses results are shown in FIG. 5. Referring to FIG. 5, a C=C bond in the compound of Formula 5 disappeared, and thus it was confirmed that polymerization (including cross-linking and graft reaction) of the compound represented by Formula 5 and the compound represented by Formula 3a was performed.

Evaluation Example 4: Ion Conductivity

Ion conductivities of the polymer electrolytes prepared in Examples 1 to 6 and the electrolytes prepared in Comparative Examples 1 and 2 were measured. The ion conductivities were measured by using an AC impedance method.

Resistances of the electrolytes prepared in Examples 1 to 6 and Comparative Examples 1 and 2 were measured while applying 10 mV of bias voltage at a frequency in a range of about 1 hertz (Hz) to about 1 MHz and scanning at a temperature of 25° C. or 60° C., and thus the ion conductivities were evaluated and shown in Table 1.

TABLE 1

| | | Ion conductivity (S/cm) (×10⁻⁶) | |
|---|---|---|---|
| | EO/Li | 25° C. | 60° C. |
| Example 1 | 65 | 1.61 | 55.7 |
| Example 2 | 33 | 1.20 | 21.5 |
| Example 3 | 46 | 1.53 | 21.8 |
| Example 4 | 33 | 0.85 | 31.5 |
| Example 5 | 33 | 9.52 | 21.3 |
| Comparative Example 1 | 20 | 0.15 | 10 |
| Comparative Example 2 | 65 | 0.50 | 0.24 |

In Table 1, EO/Li refers to a molar ratio of an ethylene oxide functional group of a hydrophilic PEO and a Li salt.

Referring to Table 1, it was confirmed that ion conductivities of the electrolytes prepared in Examples 1 to 5 improved over those of the electrolytes prepared in Comparative Examples 1 and 2 at a temperature of 25° C. Also, ion conductivities of the electrolytes prepared in Examples 1 to 5 were higher than those of the electrolyte prepared in Example 6 and have almost the same ion conductivities as the electrolyte prepared in Example 4.

Evaluation Example 5: Electrochemical Stability

Figure 6:
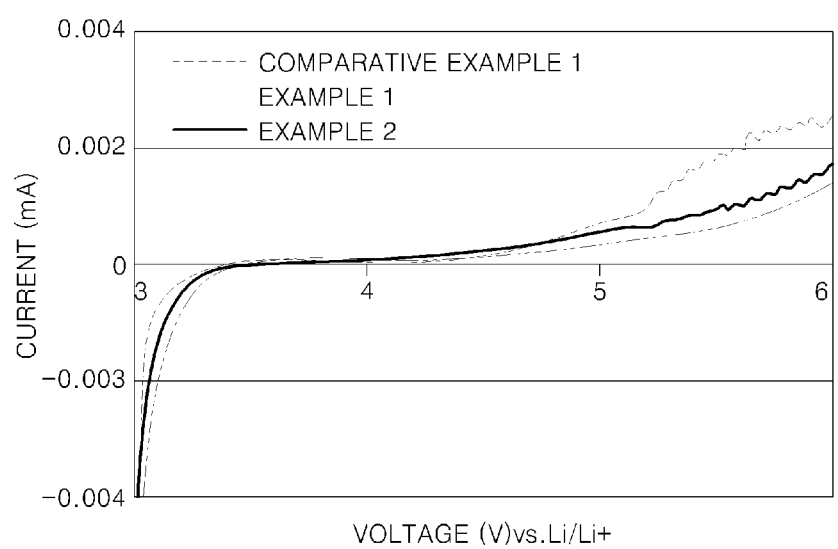
FIG. 6 is graph of current (milliamperes, mA) versus voltage versus Li/Li+ (volts, V), showing a linear sweep voltammetry (LSV) analysis result of lithium batteries including polymer electrolytes prepared in Examples 1 and 2 and Comparative Example 1.

The polymer electrolytes prepared in Examples 1 and 2 and Comparative Example 1 were each disposed between a lithium electrode and a stainless electrode to prepare a cell. A linear sweep voltammetry (LSV) analysis was performed on the cell to observe electrochemical stability of the cell, and the result is shown in FIG. 6. The LSV measuring conditions were as follows:

Voltage range: 3 V to 7 V, Scan Rate: about 0.5 mV/s, Temperature: 25° C.

Referring to FIG. 6, the cells including the polymer electrolytes prepared in Examples 1 and 2 each had improved electrochemical stability compared to that of a cell including the polymer electrolyte prepared in Comparative Example 1.

Evaluation Example 6: Solubility in Organic Solvent

Weight changes of the polymer electrolytes prepared in Examples 1 and 6 and Comparative Example 1 in 20 g of propylene carbonate, i.e., an organic solvent, were measured by measuring their weights after 12 hours and after 168 hours.

The results are shown in Table 2. In Table 2, shape maintenance of the electrolyte membranes was evaluated based on the weight change, and o is when the weight change is less than 50%, and x is when the weight change is greater than 50%.

TABLE 2

| | Initial weight (g) | After 12 hours | After 168 hours | Weight change (%) | Shape maintenance of electrolyte membrane |
|---|---|---|---|---|---|
| Example 1 | 0.46 | 0.56 | 0.55 | 19.5 | o |
| Example 6 | 0.62 | 0.83 | 0.78 | 25.8 | o |
| Comparative Example 1 | 0.56 | 1.61 | — | >200 | x |

As shown in Table 2, the polymer electrolytes prepared in Examples 1 and 6 maintain a shape of the electrolyte membrane as the solubility in an organic solvent is decreased, but a shape of the electrolyte membrane of the polymer electrolyte prepared in Comparative Example 1 was not maintained as it dissolved in the organic solvent. In this regard, since solubility in an organic solvent of the polymer electrolytes prepared in Examples 1 and 6 was reduced, it may be confirmed that polymer electrolytes prepared in Examples 1 and 6 had improved stability with respect to the electrolytic solution including the organic solvent.

Evaluation Example 7: Lithium Ion Transferrate

Lithium ion transfer rates ($t_{Li}$) were measured with respect to the electrolytes prepared in Comparative Example 1 and Examples 1 and 6 at a temperature of 21° C., and some of the results are shown in Table 3.

A lithium ion transferring rates may be calculated by Equation 1. Values needed for calculating a lithium ion transferring rate were measured by current decay values decreasing in time with respect to an input voltage and impedance of a lithium symmetrical cell or an SUS symmetrical cell (Electrochimica Acta 93 (2013) 254).

$$t_{Li^+} = \frac{i_{ss}(\Delta V - i_o R^0)}{i_o(\Delta V - i_{ss} R^{ss})} \qquad \text{Equation 1}$$

In Equation 1,
$i_o$ is an initial current,
$i_{ss}$ is a steady state current,
$R^0$ is an initial resistance,
$R_{ss}$ is a steady state resistance, $\Delta v$ is a voltage variation.

TABLE 3

| | $R_0$ (KΩ) | $R_{ss}$ (KΩ) | $i_o$ (μA) | $i_{ss}$ (μA) | $t_{Li+}$ |
|---|---|---|---|---|---|
| Example 1 | 36.2 | 39.5 | 2.12 | 1.19 | 0.35 |
| Example 2 | 1.77 | 36.8 | 2.41 | 1.17 | 0.23 |
| Comparative Example 1 | 0.585 | 0.625 | 82.4 | 46.3 | 0.18 |

Referring to Table 3, it may be confirmed that the electrolytes prepared in Examples 1 and 2 had improved lithium ion transfer rates than that of the electrolyte prepared in Comparative Example 1.

As described above, according to the one or more of the above embodiments, a polymer electrolyte for a lithium battery has a high ion conductivity and improved physical and chemical stability. When a lithium battery includes the polymer electrolyte, electrochemical stability of the lithium battery may be improved.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the present disclosure as defined by the following claims.

What is claimed is:

1. A polymer electrolyte for a lithium battery, wherein the polymer electrolyte comprises:
   a polymerization product of
   (i) a lithium ion conductive compound comprising an ethylenically unsaturated bond, a lithium ion conductive unit, and an ion-exchangeable functional group; and
   (ii) a heteroatom-containing ionic liquid polymerizable with the lithium ion conductive compound,
   wherein the heteroatom-containing ionic liquid is represented by Formula 1:

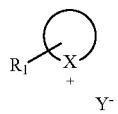

Formula 1 wherein in Formula 1,

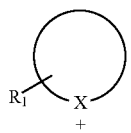

in Formula 1 is at least one selected from cations represented by Formula 2:

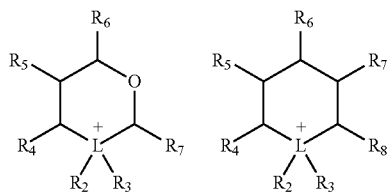

Formula 2

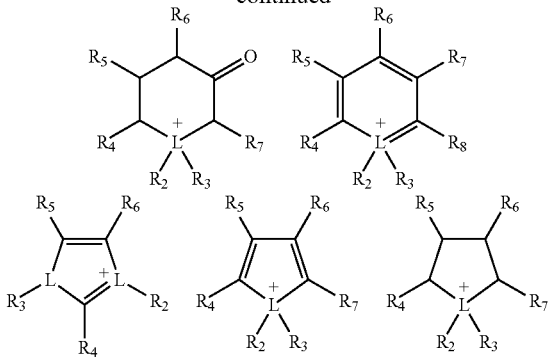

wherein in Formula 2,
L is N or P;
$R_2$ is a C2-C10 alkenyl group; and
$R_3$ to $R_8$ are each independently a hydrogen atom, an unsubstituted or substituted C1-C30 alkyl group, an unsubstituted or substituted C2-C30 alkenyl group, an unsubstituted or substituted C2-C30 alkynyl group, an unsubstituted or substituted C1-C30 alkoxy group, an unsubstituted or substituted C6-C30 aryl group, an unsubstituted or substituted C6-C30 aryloxy group, an unsubstituted or substituted C3-C30 heteroaryl group, an unsubstituted or substituted C3-C30 heteroaryloxy group, an unsubstituted or substituted C4-C30 cycloalkyl group, or an unsubstituted or substituted C3-C30 heterocycloalkyl group, and
$Y^-$ is an anion.

2. The polymer electrolyte of claim 1, wherein the ion-exchangeable functional group is at least one selected from a hydroxyl group, a phosphoric acid group, a sulfonic acid group, and a carboxylic acid group.

3. The polymer electrolyte of claim 1, wherein the lithium ion conductive unit is an alkylene oxide unit.

4. The polymer electrolyte of claim 1, wherein a side chain of the lithium ion conductive compound comprises an alkylene oxide unit.

5. The polymer electrolyte of claim 1, wherein

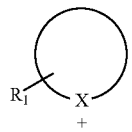

is a cation represented by Formula 2a:

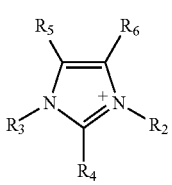

Formula 2a wherein in Formula 2a,
is a C2-C10 alkenyl group; and
$R_3$ to $R_6$ are each independently a hydrogen atom, an unsubstituted or substituted C1-C30 alkyl group, an unsubstituted or substituted C2-C30 alkenyl group, an unsubstituted or substituted C2-C30 alkynyl group, an unsubstituted or substituted C1-C30 alkoxy group, an unsubstituted or substituted C6-C30 aryl group, an unsubstituted or substituted C6-C30 aryloxy group, an unsubstituted or substituted C3-C30 heteroaryl group, an unsubstituted or substituted C3-C30 heteroaryloxy group, an unsubstituted or substituted C4-C30 cycloalkyl group, or an unsubstituted or substituted C3-C30 heterocycloalkyl group.

6. The polymer electrolyte of claim 1, wherein
$R_4$ to $R_8$ are each a hydrogen atom, and
$R_3$ is a C1-C10 alkyl group.

7. The polymer electrolyte of claim 1, wherein the heteroatom-containing ionic liquid comprises a compound represented by Formula 3:

Formula 3 wherein in Formula 3,
$R_1$ is an allyl group; and
$R_2$ is a methyl group, a butyl group, a vinyl group, or an allyl group.

8. The polymer electrolyte of claim 1, wherein the lithium ion conductive compound comprising an ethylenically unsaturated bond, a lithium ion conductive unit, and an ion-exchangeable functional group is a compound represented by Formula 4 or a polymer thereof:

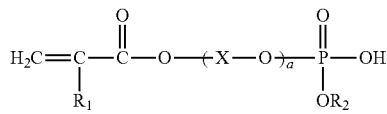

Formula 4 wherein in Formula 4,
X is an unsubstituted or substituted C1-C20 alkylene group;
a is an integer of 1 to 10;
$R_1$ is a hydrogen atom or a C1-C20 alkyl group; and
$R_2$ is selected from a hydrogen atom, an unsubstituted or substituted C1-C20 alkyl group, an unsubstituted or substituted C1-C20 hydroxyalkyl group, and an unsubstituted or substituted C1-C20 hydroxyalkylamino group.

9. The polymer electrolyte of claim 1, wherein the lithium ion conductive compound comprising an ethylenically unsaturated bond, a lithium ion conductive unit, and an ion-exchangeable functional group is a compound represented by Formula 5 or a compound represented by Formula 6:

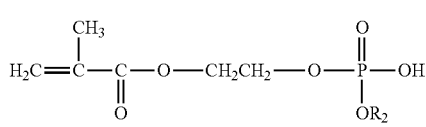

Formula 5

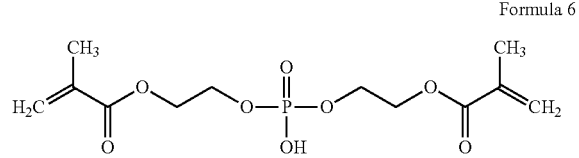 [SMILES: C=C(C)C(=O)OCCOP(=O)(O)OCCOC(=O)C(=C)C]

Formula 6

10. The polymer electrolyte of claim 1 further comprising a cross-linkable compound.

11. The polymer electrolyte of claim 10, wherein the cross-linkable compound is a compound represented by Formula 7 or Formula 8:

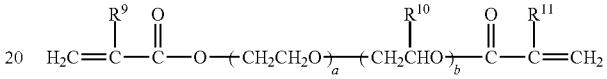

Formula 7 wherein in Formula 7,
$R_9$ to $R_{11}$ are each independently a hydrogen atom, or a C1-C10 alkyl group,
a is an integer of 0 or 1 to 10, and
b is an integer of 0 or 1 to 10,
provided that a and b are both not 0, and

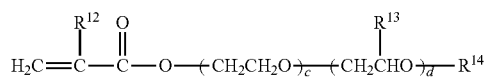

Formula 8 wherein in Formula 8,
$R_{12}$ to $R_{14}$ are each independently a hydrogen atom, or a C1-C10 alkyl group,
c is an integer of 0 or 1 to 10, and
d is an integer of 0 or 1 to 10,
provided that c and d are both not 0.

12. The polymer electrolyte of claim 1 further comprising about 0.02 mol to about 3 mol of a lithium salt based on 1 mol of the lithium ion conductive compound.

13. The polymer electrolyte of claim 1, wherein a content of the heteroatom-containing ionic liquid is from about 0.01 mol to about 1 mol based on 1 mol of the lithium ion conductive compound comprising an ethylenically unsaturated bond, a lithium ion conductive unit, and an ion-exchangeable functional group.

14. The polymer electrolyte of claim 10, wherein a content of the cross-linkable compound is from about 0.0001 parts to about 10 parts by weight based on 100 parts by weight of the total weight of the lithium ion conductive compound comprising an ethylenically unsaturated bond, a lithium ion conductive unit, and an ion-exchangeable functional group and the heteroatom-containing ionic liquid.

15. A lithium battery comprising:
a positive electrode;
a negative electrode; and
the polymer electrolyte of claim 1.

16. The lithium battery of claim 15 further comprising a separator.

17. A polymer comprising:
a polymerization product of
(i) a lithium ion conductive compound comprising an ethylenically unsaturated bond, a lithium ion conductive unit, and an ion-exchangeable functional group; and
(ii) a heteroatom-containing ionic liquid polymerizable with the lithium ion conductive compound,
wherein the heteroatom-containing ionic liquid is represented by Formula 1:

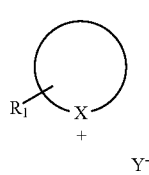

Formula 1 wherein in Formula 1,

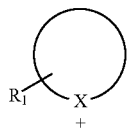

in Formula 1 is at least one selected from cations represented by Formula 2:

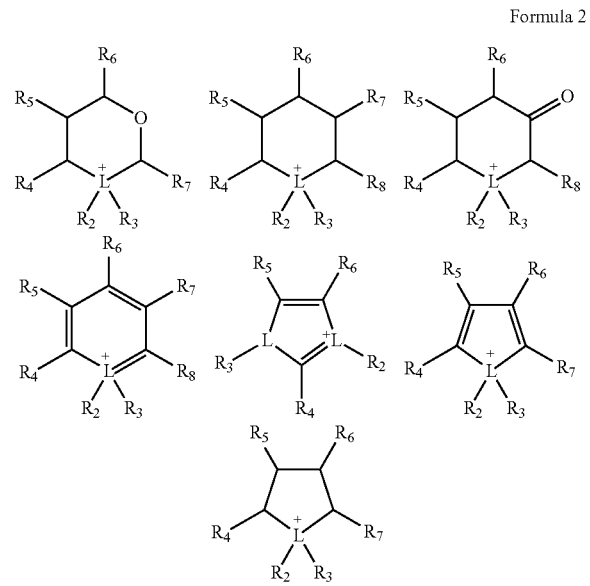

Formula 2 wherein in Formula 2,
L is N or P;
$R_2$ is a C2-C10 alkenyl group; and
$R_3$ to $R_8$ are each independently a hydrogen atom, an unsubstituted or substituted C1-C30 alkyl group, an unsubstituted or substituted C2-C30 alkenyl group, an unsubstituted or substituted C2-C30 alkynyl group, an unsubstituted or substituted C1-C30 alkoxy group, an unsubstituted or substituted C6-C30 aryl group, an unsubstituted or substituted C6-C30 aryloxy group, an unsubstituted or substituted C3-C30 heteroaryl group, an unsubstituted or substituted C3-C30 heteroaryloxy group, an unsubstituted or substituted C4-C30 cycloalkyl group, or an unsubstituted or substituted C3-C30 heterocycloalkyl group, and
$Y^-$ is an anion.

18. The polymer of claim 17, wherein the lithium ion conductive compound comprising an ethylenically unsaturated bond, a lithium ion conductive unit, and an ion-exchangeable functional group is a compound represented by Formula 4 or a polymer thereof:

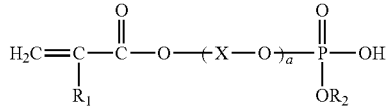

Formula 4 wherein in Formula 4,
X is an unsubstituted or substituted C1-C20 alkylene group;
a is an integer of 1 to 10;
$R_1$ is a hydrogen atom or a C1-C20 alkyl group; and
$R_2$ is selected from a hydrogen atom, an unsubstituted or substituted C1-C20 alkyl group, an unsubstituted or substituted C1-C20 hydroxyalkyl group, and an unsubstituted or substituted C1-C20 hydroxyalkylamino group.

19. The polymer of claim 17 further comprising a crosslinkable compound selected from a compound represented by Formula 7 and a compound represented by Formula 8:

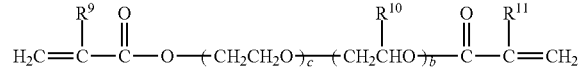

Formula 7 wherein in Formula 7,
$R_9$ to $R_{11}$ are each independently a hydrogen atom, a C1-C10 alkyl group,
a is an integer of 0 or 1 to 10, and
b is an integer of 0 or 1 to 10,
provided that both a and b are both not 0, and

Formula 8 wherein in Formula 8,
$R_{12}$ to $R_{14}$ are each independently a hydrogen atom, a C1-C10 alkyl group,
c is an integer of 0 or 1 to 10, and
d is an integer of 0 or 1 to 10,
provided that c and d are both not 0.

20. A negative electrode protection layer for a lithium battery comprising the polymer of claim 17.

21. A polymer electrolyte for a lithium battery, wherein the polymer electrolyte comprises:
i) a polymerization product of a compound represented by Formula 5 and 1-allyl-3-methylimidazolium bis(trifluoromethylsulfonyl)imide represented by Formula 3a;

Formula 5 Formula 3a

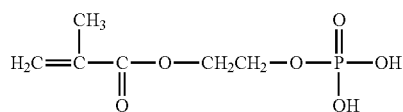

Formula 5

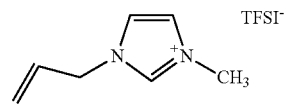

Formula 3a wherein in Formula 3a "TFSI" denotes bis(trifluoromethylsulfonyl)imide;

ii) a polymerization product of a compound represented by Formula 6 and the 1-allyl-3-methylimidazolium bis(trifluoromethylsulfonyl)imide represented by Formula 3a;

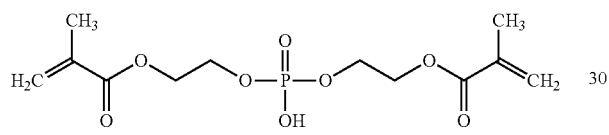

Formula 6 iii) a polymerization product of a compound represented by Formula 5 and 1-allyl-3-methylimidazolium bis(trifluoromethylsulfonyl)imide represented by Formula 3b; and

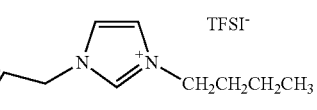

Formula 3b wherein in Formula 3b "TFSI" denotes bis(trifluoromethylsulfonyl)imide; and iv) a polymerization product of a compound represented by Formula 5, the 1-allyl-3-methylimidazolium bis(trifluoromethylsulfonyl)imide represented by Formula 3a, and polyethyleneoxidediacrylate represented by Formula 7a;

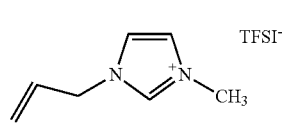

Formula 3a

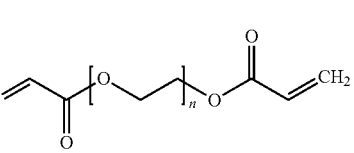

Formula 7a wherein, in Formula 7a, n is about 5.

* * * * *